US009796860B2

(12) United States Patent
Leutfeld et al.

(10) Patent No.: US 9,796,860 B2
(45) Date of Patent: Oct. 24, 2017

(54) STORAGE-STABLE UREA PREPARATIONS WHICH ARE SUITABLE AS RHEOLOGY CONTROL AGENTS

(71) Applicant: BYK-Chemie, GmbH, Wesel (DE)

(72) Inventors: Daniela Leutfeld, Wesel (DE); Marc Eberhardt, Wesel (DE); René Nagelsdiek, Hamminkeln (DE); Sylvia Bühne, Duisburg (DE); Jürgen Omeis, Dorsten-Lembeck (DE); Berthold Jacobs, Reken (DE)

(73) Assignee: BYK-Chemie GmbH, Wesel (DE)

( * ) Notice: Subject to any disclaimer, the term of this patent is extended or adjusted under 35 U.S.C. 154(b) by 0 days.

(21) Appl. No.: 15/303,620

(22) PCT Filed: Apr. 15, 2015

(86) PCT No.: PCT/EP2015/058210
§ 371 (c)(1),
(2) Date: Oct. 12, 2016

(87) PCT Pub. No.: WO2015/158794
PCT Pub. Date: Oct. 22, 2015

(65) Prior Publication Data
US 2017/0037262 A1 Feb. 9, 2017

(30) Foreign Application Priority Data
Apr. 15, 2014 (EP) .................................. 14164795

(51) Int. Cl.
C09D 7/00 (2006.01)
C09D 5/04 (2006.01)
C08G 18/28 (2006.01)
C08G 18/32 (2006.01)

(52) U.S. Cl.
CPC ........... *C09D 7/002* (2013.01); *C08G 18/283* (2013.01); *C08G 18/2825* (2013.01); *C08G 18/324* (2013.01); *C09D 5/04* (2013.01)

(58) Field of Classification Search
CPC   C08G 18/2825; C08G 18/283; C08G 18/324; C09D 5/04; C09D 7/002
USPC ....................................................... 524/199
See application file for complete search history.

(56) References Cited

U.S. PATENT DOCUMENTS 2,667,511 A   1/1954 Downing
3,288,794 A   11/1966 Kuceski

FOREIGN PATENT DOCUMENTS

CA   2 352 660 A1   2/2002
DE       875 807 C   5/1953

(Continued)

OTHER PUBLICATIONS

PCT/EP2015/058210—International Search Report, dated Aug. 3, 2015. English Translation.
PCT/EP2015/058210—International Written Opinion, dated Aug. 3, 2015. English Translation.
PCT/EP2015/058210—International Preliminary Report on Patentability, dated Oct. 18, 2016.
Aoyagi, T. et al., "Preparation of Alkyl-Substituted Pyrrolidone Derivatives and Their Evaluation as Transdermal Penetration Enhancers", Drug Design and Discovery, 1991, vol. 8, Issue 1, pp. 37-46. Abstract Only.
Fabienne Fache, et al., "Extension of the Eschweiler-Clarke Procedure to the N-Alkylation of Amides", Tetrahedron Letters, May 16, 1994, vol. 35, Issue 20, pp. 3313-3314. Abstract Only.
Fabienne Fache, et al., "Reductive O- and N-alkylations, Alternative Catalytic Methods to Nucleophilic Substitution", Studies in Surgace Science and Catalysis, 1997, vol. 108, pp. 115-122. Abstract Only.
George M. Iskander, et al., "Synthesis and properties of poly(1-alkyl-3-methylene-2-pyrrolidone)s", Macromolecular Chemistry and Physics, Oct. 1996, vol. 197, Issue 10, pp. 3123-3133. Abstract Only.
Woo Song Lee, et al., "N,N-Dimethylamination of Acid Chlorides with Dmf", Synthetic Communications, Nov. 24, 1999, vol. 30, Issue 23, pp. 4241-4245. Abstract Only.

*Primary Examiner* — Ling Choi
*Assistant Examiner* — Chun-Cheng Wang
(74) *Attorney, Agent, or Firm* — Curatolo Sidoti Co., LPA; Joseph G. Curatolo; Salvatore A. Sidoti

(57) ABSTRACT

The invention relates to a urea preparation containing (A) 5 to 75 wt. % of one or more urea components which have a molecular weight of at least 350 g/mol and contain at least one urea group; (B) 15 to 95 wt. %, preferably 30 to 80 wt. %, of one or more organic solvents from the group of N alkyl amides that have a molecular weight of 155 to 700 g/mol, are free of urea groups, and have the following formula (I), in which (a) $R^1$ is an x-containing hydrocarbon group, where x=1 to 24 carbon atoms, $R^2$ is a y-containing organic group, where y=1 to 12 carbon atoms, and $R^3$ is a z-containing organic group, where z=1 to 12 carbon atoms, or (b) $R^1$, $R^2$, and $R^3$ are defined as in (a) but $R^1$ and $R^2$ are connected to each other by a chemical bond and together form a ring with 4 to 10 ring atoms while incorporating the group C(=O)N, and in the case of a ring with 4 or 5 ring atoms, $R^3$ contains at least 6 carbon atoms and maximally 11 carbon atoms, or (c) $R^1$, $R^2$, and $R^3$ are defined as in (a) but $R^2$ and $R^3$ are connected to each other by a chemical bond and together form a ring with 4 to 10 ring atoms while incorporating the nitrogen atom of the general formula (I) with the proviso that for each of (a), (b), and (c), x+y+z≥8; (C) 0 to 35 wt. % of one or more organic solvents which differ from (B) and do not contain urea groups or ionic groups and which have maximally two heteroatoms selected from the group consisting of nitrogen and oxygen; and (D) 0 to 50 wt. % of a salt which differs from the urea component(s) (A), the solvent(s) (B), and the solvent(s) (C), wherein the sum of all of the stated weight percentages equals the total weight of the urea preparation. The invention further relates to the use of the urea preparation as a rheology additive for liquid compositions and to liquid media which contain the urea preparations.

13 Claims, 1 Drawing Sheet

(56) References Cited

U.S. PATENT DOCUMENTS

| | | |
|---|---|---|
| 3,417,114 A | 12/1968 | Kuceski |
| 3,674,851 A | 7/1972 | Senoo et al. |
| 3,751,465 A | 8/1973 | Takahashi et al. |
| 3,767,644 A | 10/1973 | Fukuoka et al. |
| 3,856,791 A | 12/1974 | Daniher et al. |
| 4,299,840 A | 11/1981 | Skinner et al. |
| 4,314,924 A | 2/1982 | Haubennestel et al. |
| 4,814,464 A | 3/1989 | Olsen |
| 5,101,045 A | 3/1992 | Koehler et al. |
| 5,478,950 A | 12/1995 | Bergfeld et al. |
| 5,508,396 A | 4/1996 | Steffen |
| 5,986,092 A | 11/1999 | Denarie et al. |
| 6,420,466 B1 | 7/2002 | Haubennestel et al. |
| 6,870,024 B2 | 3/2005 | Haubennestel et al. |
| 8,536,355 B2 | 9/2013 | Radhakrishnan et al. |
| 8,956,452 B2 | 2/2015 | Orth et al. |
| 2004/0127674 A1 | 7/2004 | Haubennestel et al. |
| 2006/0155146 A1* | 7/2006 | Lenges .............. C07C 275/10 564/32 |
| 2009/0093647 A1 | 4/2009 | Radhakrishnan et al. |
| 2010/0204376 A1 | 8/2010 | Lenges et al. |
| 2011/0265691 A1 | 11/2011 | Orth et al. |
| 2012/0226075 A1 | 9/2012 | Leutfeld et al. |

FOREIGN PATENT DOCUMENTS

| | | |
|---|---|---|
| DE | 28 22 908 | 7/1979 |
| DE | 199 19 482 A1 | 11/2000 |
| DE | 102 41 853 B3 | 1/2004 |
| DE | 10 2008 059 702 A1 | 6/2010 |
| EP | 0 006 252 A1 | 1/1980 |
| EP | 1 188 779 A1 | 3/2002 |
| EP | 2 292 675 A1 | 3/2011 |
| GB | 719792 | 12/1954 |
| WO | WO 93/16042 | 8/1993 |
| WO | WO 93/17787 | 9/1993 |
| WO | WO 2006/033117 A2 | 3/2006 |

* cited by examiner

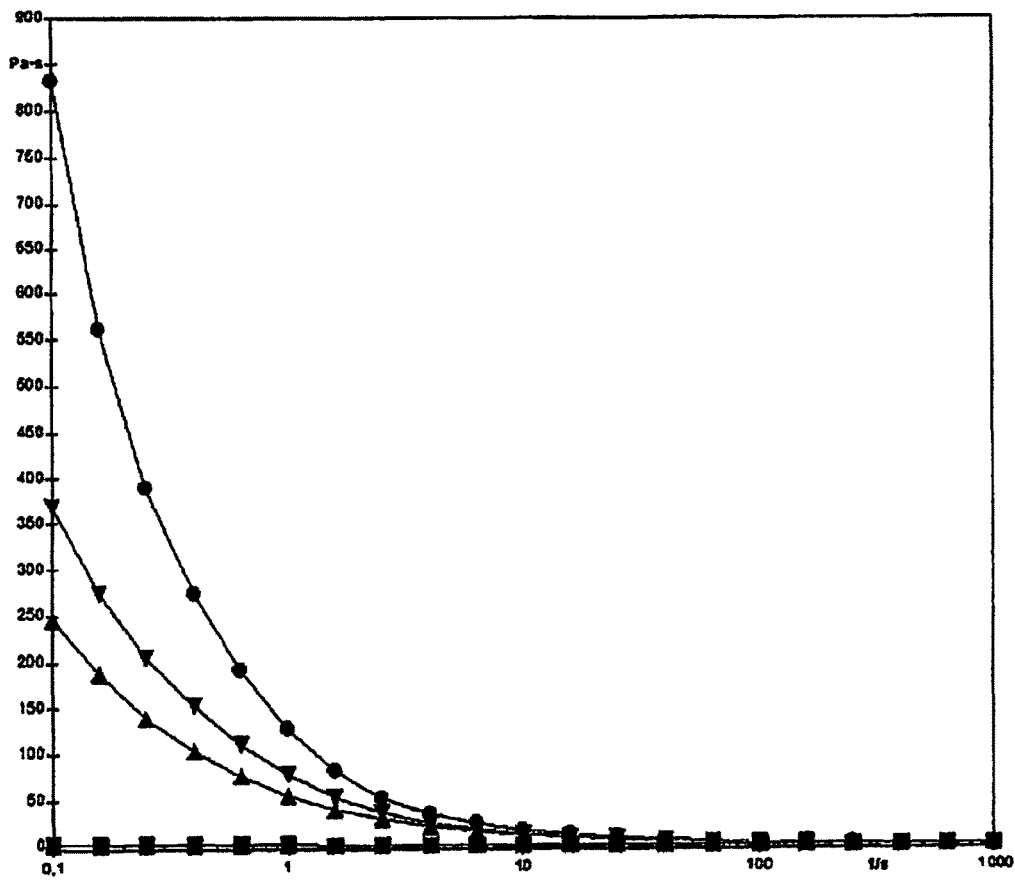
Horizontal axis → shear rate in s⁻¹
Vertical axis → viscosity η in Pa·s;
Results shown: ● example a6, ▲ comparative example C3,
▼ comparative example C2, ■ blank sample

STORAGE-STABLE UREA PREPARATIONS WHICH ARE SUITABLE AS RHEOLOGY CONTROL AGENTS

CROSS REFERENCE TO RELATED APPLICATIONS

This application is a national stage application of International Application No. PCT/EP2015/058210, filed 15 Apr. 2015, which claims priority from European Patent Application No. 14164795.8, filed 15 Apr. 2014, which applications are incorporated herein by reference.

The present invention relates to urea preparations having elevated storage stability, to the use thereof for controlling the rheology of liquid mixtures, and to formulations comprising the urea preparations of the invention.

In order to control the rheology of liquid systems, especially liquid coating systems, rheological auxiliaries used are predominantly organically modified bentonites, silicas, hydrogenated castor oil and polyamide waxes.

A disadvantage of the use of these rheological auxiliaries is that they are usually in the form of dry solids. Consequently, therefore, said rheological auxiliaries, prior to use, are first digested using solvents and shear forces to form a semifinished product. Alternatively, the as yet undigested rheological auxiliaries can also be used in such a way that they are introduced by means of specific temperature control into the liquid application system, for example a coating system. If this temperature control is not effected according to the target specifications, crystallites that typically occur in the finished coating system can lead to defects in the coating.

A general disadvantage of the use of these rheological auxiliaries is that they cause turbidity and haze in clear transparent coatings. Moreover, handling of dry, pulverulent products, which can cause dusts on processing, is undesirable.

A liquid application alternative to these solid rheology control agents is that of solutions of specific urea components. Solutions of this kind are frequently used in practice and are described, for example, in EP-A-1188779. Solvents explicitly mentioned herein are polar/aprotic solvents such as dimethyl sulfoxide, dimethylformamide, dimethylacetamide, N-methylpyrrolidone and N-butylpyrrolidone, but the examples use exclusively dimethylacetamide and N-methylpyrrolidone. DE-A-19919482 discloses the use of dimethyl sulfoxide, dimethylformamide and -acetamide, N-methylpyrrolidone, N-butylpyrrolidone and comparable N-alkylpyrrolidones, without explicitly mentioning or even using the latter, as suitable media for dissolution of urea derivatives. EP-A-0006252 mentions, as well as N-methylpyrrolidone, N-butylpyrrolidone, dimethyl sulfoxide, dimethylformamide and dimethylacetamide, also N,N,N',N'-tetramethylurea as a suitable solvent. In the context of the aforementioned invention, however, only dimethyl sulfoxide, dimethylformamide and N-methylpyrrolidone were used in the examples. As an advantageous alternative over N-methylpyrrolidone, DE-A-102008059702 proposes the use of so called ionic liquids, which are in fact salt melts that are liquid under moderate temperature conditions (usually below 80° C., ideally at room temperature). The rheology-controlling properties of dissolved urea components are usually quite good, but there is a desire in many cases for even further-optimized rheology-controlling characteristics. Optimized characteristics are manifested frequently not only in improved rheological efficacy, but in some cases also in broad compatibility in application-relevant formulations, for example binder-containing systems.

A further aspect which should be noted in connection with rheology auxiliaries provided in liquid form is the storage stability thereof. For instance, prolonged storage times or elevated storage stress, for example in the case of storage with temperature variations, can lead to reduced storage stability, accompanied by reduced efficacy in the target system. This is because, while the urea components are supposed to display their rheology-controlling effect in the application systems, for example by crystallization in these systems, any thickening effect of the urea components or even crystallization in the storage form of the urea preparation is extremely undesirable. The choice of storage-stable preparations to date has been restricted essentially to systems comprising the abovementioned solvents. The choice of suitable solvents is therefore difficult, since these especially have to be compatible with the later application systems, and at the same time also have to assure adequate storage stability of the preferably liquid composition and meet further demands (for example no reaction of the solvent with the rheology-controlling component or with other constituents of the application system).

There is therefore still a need for urea preparations that are improved in terms of rheological efficacy and storage stability. The rheological efficacy of a formulation can be ascertained, for example, on the basis of the stability under load, i.e. the yield point of a coating material formulated with the urea preparation. In addition, urea formulations having broad compatibility in application-relevant formulations, for example varnishes, are required. More particularly, varnishes produced therewith should have a minimum level of formation of specks, streaks and/or turbidity.

Thus, it is a particular object of the present invention to provide a correspondingly high-quality rheology control agent of good effectiveness and having improved storage stability.

The object was achieved by the provision of a urea preparation comprising (A) 5% to 75% by weight, preferably 10% to 65% by weight, more preferably 15% to 60% by weight, most preferably 20% to 55% by weight, of one or more urea components having a molecular weight of ≥350 g/mol and containing at least one urea group, (B) 15% to 95% by weight, preferably 20% to 85% by weight, more preferably 30% to 80% by weight, of one or more organic solvents from the group of the N-alkylamides which have a molecular weight of 155 to 700 g/mol, are free of urea groups and have the following general formula (I):

in which (a) $R^1$ is a hydrocarbyl radical containing x=1 to 24 carbon atoms, $R^2$ is an organic radical containing y=1 to 12 carbon atoms, and $R^3$ is an organic radical containing z=1 to 12 carbon atoms, or (b) $R^2$ and $R^3$ are as defined under (a), but $R^1$ and $R^2$ are bonded to one another by a chemical bond and together, with inclusion of the C(=O)N group, form a ring having 4 to 10 ring atoms; and, in the case of a ring having 4 to 5 ring atoms in which x+y<4, the $R^3$ radical contains at least 6 carbon atoms and at most 11 carbon atoms or (c) $R^1$, $R^2$ and $R^3$ are as defined under (a), but $R^2$ and $R^3$ are bonded to one another by a chemical bond and together, with inclusion of the nitrogen atom in the general formula (I), form a ring having 4 to 10 ring atoms, with the proviso that, for each of (a), (b) and (c), x+y+z≥8, (C) 0% to 35% by weight, preferably 0% to 25% by weight, of one or more organic solvents other than (B) which do not contain any urea group or any ionic group and have a maximum of two heteroatoms selected from the group consisting of nitrogen and oxygen, and (D) 0% to 50% by weight, preferably 0% to 15% by weight, of a salt and differs from the urea component(s) (A), the solvent(s) (B) and the solvent(s) (C), and where all percent by weight figures are based on the total weight of the urea preparation.

All the aforementioned components (A), (B), (C) and (D), and component (E) mentioned hereinafter, may comprise one or more species covered by the respective definition of the particular component. All percentage limits for the components apply both in the case that the component in each case consists only of one species and in the case that several species form the particular component, in which case the sum total of the proportions by weight of the individual species has to be within the percentage limits.

If one or more of the components are restricted to a specific species or to a group of specific species, the species now ruled out from this component may still be present in the urea preparation of the invention, but not in an amount that, in sum total together with the species remaining in the particular component, exceeds the original percentage limits for the component.

If, for example, in a particular embodiment of the invention, the urea component (A) excludes those species having a weight-average molecular weight of 60 000 g/mol or more, the rule that applies to the species having a molecular weight of ≥350 g/mol and simultaneously a weight-average molecular weight of less than 60 000 g/mol, which are still referred to as urea component (A), is that they may be present in an amount of 5% to 75% by weight, based on the total weight of the urea preparation. If the remaining species, however, are present only in a proportion of 65% by weight, not more than 10% by weight, based on the total weight of the urea preparation, of the urea species having a weight average molecular weight of 60 000 g/mol or more that has been excluded from the restricted definition of the urea component (A) may be present.

Those species that were originally attributable to one of components (A), (B), (C) or (D) but are no longer covered by the definition thereof by virtue of specification of the particular component are then regarded as species of component (E) as defined below. In that case, they are necessarily subject, in terms of their percentage proportions, together with the species remaining in the component from which they have been excluded, to the original percentage limits for the particular component as exemplified in the preceding paragraph. However, they are preferably also additionally subject to the limits for the maximum proportion of component (E) specified with preference for component (E).

Urea Components (A)

The molecular weight of the urea components (A) according to the claims is restricted in the low molecular weight range in that urea components (A) having molar masses of less than 350 g/mol are generally less rheologically active or are even rheologically inactive. Such substances that have low activity or are inactive having molecular weights below 350 g/mol are typically specific monomeric or low molecular weight oligomeric compounds having a defined molecular weight, such that there is no need to specify a weight- or number-average molecular weight, since these compounds generally do not have molecular inhomogeneity. The lower limit of 350 g/mol chosen according to the claims is thus the actual molecular weight of the species and can be determined, for example, by means of NMR. The term "urea component" thus includes both chemical compounds in the sense of pure materials having an exactly defined molecular weight and oligomeric or polymeric components, i.e. polydisperse components. If different urea components are mentioned, what this means is that these—for example in the case of oligomers or polymers—differ not just in terms of their chain length or the molecular weight but also with regard to the chemical base units used in terms of type and/or amount.

The upper limit in the molecular weight of the urea components (A), by contrast, is uncritical, provided that there is still compatibility of the urea components (A) with the further constituents of the rheology control agent and the later preparation in which the urea components (A) are used. The typical compatibility limits are typically attained by polymeric urea components (A) for which only averaged molecular weights can be specified. Typically suitable as urea components (A) are those having a weight average molecular weight of less than 60 000 g/mol, but it is also possible in the individual case to use urea components having a higher molecular weight, for example 80 000 or 100 000 g/mol, provided that compatibility in the corresponding systems is assured. A person of average skill in the art, in the event of inadequate compatibility, will easily be able to revert to urea components (A) having a lower weight-average molecular weight.

A person of average skill in the art will be aware that, for higher molecular weight ranges, preference should be given to other methods instead of NMR spectroscopy for the determination of the molecular weights. The determination of the weight-average molecular weight of the urea components (A) having a molar mass of more than 1000 g/mol is effected, in accordance with the description which follows, as the weight average of the molar mass distribution determined by means of gel permeation chromatography (GPC). The GPC molar mass distribution is determined according to DIN 55672 Part 2 of January 2008. The eluent used is a solution of lithium bromide (content 5 g/L) in dimethylacetamide. Calibration is accomplished using narrow-distribution polymethyl-methacrylate standards of linear structure having molecular weights between 1 000 000 and 102 g/mol. The temperature of the overall GPC system (injector, sample plate, detectors and columns) is 80° C. The weight-average molar masses of the urea components (A) at 350 g/mol up to about 1000 g/mol can be determined, for example, by means of NMR, by expressing the integrals of relevant NMR resonance signals as ratios. However, choice of determination method in this range is uncritical since all that should be assured in accordance with the claims is that the urea components (A)—as explained above—have a molecular weight of at least 350 g/mol.

In a particularly preferred embodiment of the invention, 70% by weight to 100% by weight of the urea component (A), based on the total weight of the urea components (A), has either at least two urea groups or at least one urea group and at least one urethane group.

Most preferably, the urea components (A) are ureaurethanes. Among the ureaurethanes, preference is given particularly to those bearing at least two urea groups and at least two urethane groups. More particularly, preference is given to those bearing an average of two urea groups and two urethane groups.

Frequently, 50% to 100% by weight of the urea component (A), based on the total weight of the urea components (A), of the general formula (II)

$$R^{31}-[R^{33}-Z-R^{34}-W-]_n R^{32} \qquad (II)$$

is present, in which
- $R^{31}$ and $R^{32}$ in each case are the same or different and are each independently a branched or unbranched, saturated or unsaturated organic radical which contains 1 to 100, preferably 10 to 90, more preferably 20 to 80, carbon atoms and has a maximum of one urea group in each case and a maximum of one urethane group in each case,
- $R^{33}$ and $R^{34}$ in each case are the same or different and are each independently branched or unbranched polyester radicals containing 1 to 300, preferably 5 to 200, more preferably 6 to 150, carbon atoms and optionally containing ether groups, branched or unbranched polyether radicals containing 2 to 300, preferably 3 150, more preferably 4 to 100, carbon atoms, branched or unbranched polyamide radicals containing 1 to 300, preferably 5 to 200, more preferably 6 to 150, carbon atoms, polysiloxane radicals containing 3 to 100, preferably 6 to 60, more preferably 9 to 39, silicon atoms, branched or unbranched $C_2$-$C_{22}$-alkylene radicals, branched or unbranched $C_3$-$C_{18}$-alkenylene radicals, $C_3$-$C_{12}$-arylene radicals and/or branched or unbranched $C_7$-$C_{22}$-arylalkylene radicals,
- Z and W in each case are the same or different and are each independently NH—CO—O and/or NH—CO—NH, and
- n is an integer from 1 to 150, preferably from 2 to 120, more preferably 4 to 50.

In a specific embodiment of the invention, 50% to 100% by weight of the urea component (A), based on the total weight of the urea components (A), in each case has a weight-average molecular weight of 2000 to 60 000 g/mol, preferably 3000 to 30 000 g/mol, more preferably 4000 to 20 000 g/mol, and contains 4 to 150, preferably 5 to 65 and more preferably 6 to 35 urea groups.

In a typical embodiment of the invention, 50% to 100% by weight of the urea component (A), based on the total weight of the urea components (A), in each case of one or more of the general formulae selected from the group consisting of (IIIa), (IIIb), (IIIc) and (IIId)

is present, in which
- AM is a linear or branched, saturated or unsaturated, aliphatic, aromatic or aliphatic-aromatic organic radical having 2 to 50, preferably 2 to 20, more preferably 4 to 14, most preferably 6 to 10, carbon atoms,
- AM1 and AM2 in each case are the same or different and are each independently a linear or branched, saturated or unsaturated, aliphatic, aromatic or aliphatic-aromatic organic radical having 1 to 50, preferably 2 to 24, more preferably 3 to 18, most preferably 4 to 12, carbon atoms, where this organic radical may also have further functional groups such as hydroxyl groups, ether groups or amino groups,
- IC1 and IC2 in each case are the same or different and are each independently a linear or branched, saturated or unsaturated, aliphatic, aromatic or aliphatic-aromatic hydrocarbyl radical having 2 to 40, preferably 4 to 20, more preferably 5 to 18, most preferably 6 to 13, carbon atoms,
- IC3 is a linear or branched, saturated or unsaturated, aliphatic, aromatic or aliphatic-aromatic hydrocarbyl radical having 1 to 24, preferably 2 to 20, more preferably 6 to 18, carbon atoms,
- RP1 and RP2 in each case are the same or different and are each independently a linear or branched, saturated or unsaturated, aliphatic, aromatic or aliphatic-aromatic organic radical having 1 to 24, preferably 2 to 20, more preferably 4 to 18 carbon atoms, most preferably 8 to 14, and/or a polyether radical having 1 to 120, preferably 1 to 50, more preferably 2 to 20, most preferably 3 to 15, ether oxygen atoms and/or a polyester radical having 1 to 100, preferably 1 to 50, more preferably 2 to 20, ester groups and optionally containing ether groups and/or a polyamide radical having 1 to 100, preferably 1 to 50, more preferably 2 to 20, amide groups and/or a polysiloxane radical having 3 to 100, preferably 3 to 60, more preferably 6 to 39, silicon atoms,
- RP3 are the same or different and are a linear or branched, saturated or unsaturated, aliphatic, aromatic or aliphatic-aromatic hydrocarbyl radical having 1 to 24, preferably 2 to 18, more preferably 2 to 14, carbon atoms and/or a (poly)ether radical having 1 to 120, preferably 1 to 25, more preferably 2 to 20, most preferably 2 to 15, ether oxygen atoms and/or a polyamide radical having 1 to 100, preferably 1 to 30, more preferably 2 to 20, amide groups and/or a polysiloxane radical having 3 to 100, preferably 3 to 60, more preferably 6 to 30, silicon atoms and/or a polyester radical having 1 to 100, preferably 1 to 25, more preferably 2 to 20, most preferably 2 to 15, ester groups and optionally containing ether groups and

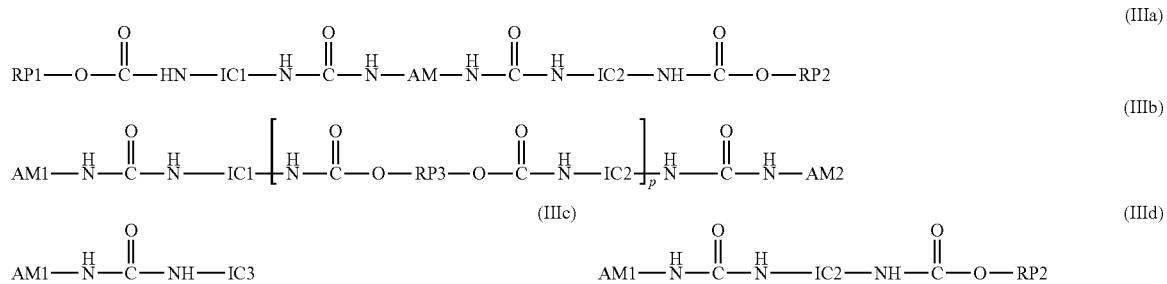

p is 0 or 1.

In such a case, preferably 70% to 100% by weight of the urea component (A), based on the total weight of the urea components (A), of one or more of the general formulae selected from the group consisting of (IIIa), (IIIb), (IIIc) and (IIId) is present, where AM is selected from the group consisting of

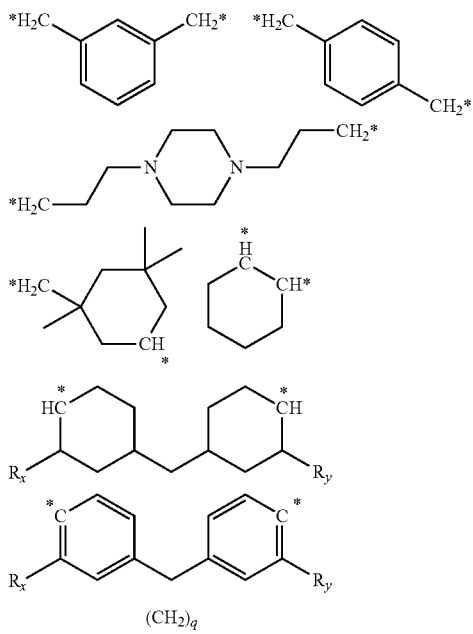

(CH$_2$)$_q$ in which R$_x$ and R$_y$ are the same or different and are each independently CH$_3$ and/or hydrogen, and q is the same or different and is an integer from 2 to 12, preferably from 2 to 8, more preferably from 2 to 6, AM1 and AM2 in each case are the same or different and are selected from the group consisting of n-propyl, isopropyl, butyl, isobutyl, tert-butyl, lauryl, oleyl, stearyl, polyisobutylene and polyether radicals having 2 to 40, preferably 2 to 20, more preferably 3 to 15, ether oxygen atoms, benzyl, methylbenzyl, cyclohexyl, carboxyalkyl, hydroxyalkyl and alkylalkoxysilane, IC1 and IC2 in each case are the same or different and are selected from the group consisting of

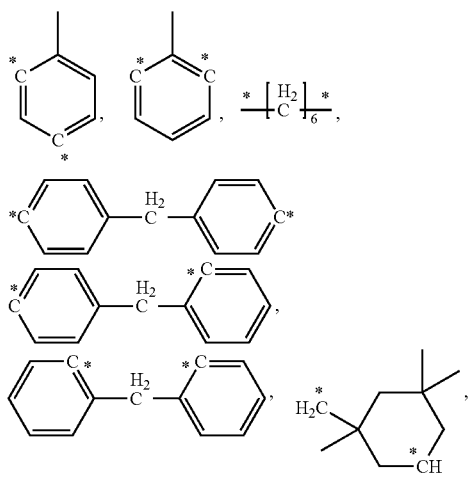

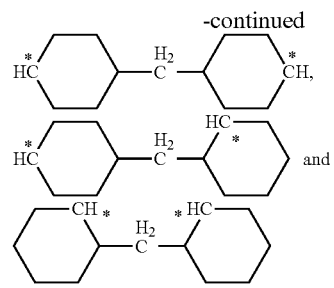

IC3 is selected from the group consisting of methyl, ethyl, phenyl, benzyl, cyclohexyl and stearyl, RP1 and RP2 in each case are the same or different and are selected from the group consisting of branched or unbranched C$_1$- to C$_{18}$-alkyl radicals, an oleyl, benzyl or allyl radical, preferably polyether radicals containing structural units of ethylene oxide, propylene oxide and/or butylene oxide, and polyester radicals containing structural units of epsilon-caprolactone and/or delta-valerolactone, RP3 is the same or different and is selected from the group consisting of linear or branched C$_1$- to C$_{18}$-alkylene radicals, linear or branched C$_2$- to C$_{18}$-alkenylene radicals and preferably polyether radicals containing structural units of ethylene oxide, propylene oxide and/or butylene oxide and having 1 to 25, preferably 2 to 20, more preferably 2 to 15, ether oxygen atoms.

In a specific embodiment, 70% to 100% by weight of the urea component (A), based on the total weight of the urea components (A), is preparable in each case by reaction of by isocyanurate and/or uretdione formation oligomerized isocyanates with monofunctional amines.

In a particular embodiment of the invention, 95% to 100% by weight, preferably 98% to 100% by weight, of the urea component (A), based on the total weight of the urea components (A), in each case comprises at least one molecule segment of the general formula (IVa)

—O—CO—NH—Y$_1$—NH—CO—NH— (IVa)

in which
Y$_1$ is a saturated or unsaturated, branched or unbranched hydrocarbyl radical containing 4 to 20, preferably 5 to 18, more preferably 6 to 13, most preferably 6 to 7, carbon atoms, and in each case no molecule segment of the general formula (IVb)

—O—CO—NH—Y$_2$—NH—CO—O— (IVb)

in which
Y$_2$ is a saturated or unsaturated, branched or unbranched hydrocarbyl radical containing 4 to 20, preferably 5 to 18, more preferably 6 to 13, most preferably 6 to 7, carbon atoms.

The urea components (A) can be prepared in a known manner by reaction of corresponding isocyanates with amines. Preparation processes for such urea components are described in detail, for example, in EP 0006252, DE 2822908, DE 10241853, DE 19919482, EP 1188779 and DE 102008059702. The preparation of higher molecular weight urea components in particular is disclosed, for example, in EP 2292675. Preferably, the preparation of the urea component (B) also takes place by this preparation process. Preferred urea preparations of the invention for rheology control are therefore also those in which the urea component (B) has been obtained by such a preparation process.

Organic Solvent (B)

The $R^1$ radical in the above-specified general formula (I) may be the same or different for all compounds in the case of use of several different compounds (B). $R^1$ may be branched or unbranched, and saturated or unsaturated.

$R^1$ more preferably contains 1 to 20, even more preferably 1 to 16, especially preferably 2 to 12, carbon atoms.

The $R^2$ and $R^3$ radicals may each independently be the same or different within a compound of the general formula (I). They may each independently be branched or unbranched, and saturated or unsaturated.

More preferably, the organic $R^2$ and $R^3$ radicals each independently contain 1 to 11, more preferably 1 to 10, carbon atoms. More preferably, the $R^2$ and $R^3$ radicals are independently heteroatom-free hydrocarbyl radicals.

If the $R^1$ and $R^2$ radicals are joined to one another by a chemical bond and they form, together with the CO—N moiety, a ring as shown in the following general formula (I'):

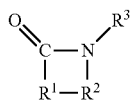

(I')

the ring preferably contains 4 to 8, more preferably 5 to 7, ring atoms. Preferably, the ring atoms of the $R^1$-$R^2$ radical are carbon atoms and optionally not more than one oxygen atom which is not bonded directly to the O=C—$NR^3$ group. More preferably, all ring atoms of the $R^1$-$R^2$ radical are carbon atoms.

If the $R^2$ and $R^3$ radicals are joined to one another by a chemical bond and they form, together with the nitrogen atom of the amide group, a ring as shown in the following general formula (I"):

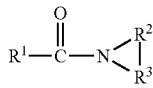

(I")

the ring preferably contains 4 to 8, more preferably 5 to 6, ring atoms. Preferably, the ring atoms of the $R^2$-$R^3$ radical are carbon atoms and optionally not more than one oxygen atom which is not bonded directly to the ring nitrogen atom. More preferably, all ring atoms of the $R^2$-$R^3$ radical are carbon atoms.

The solvent (B) is an organic solvent which can provide the urea component (A) described in liquid form, i.e. as a urea solution, at a temperature between 5 and 80° C., preferably between 15 and 60° C., more preferably at room temperature (23° C.). It is generally the case that all urea preparations of the invention at 23° C. are preferably in liquid or pasty form, more preferably in liquid form. The solvent (B) is preferably in liquid form, typically at 23° C.

The solvent (B) can in principle be divided into two categories: firstly solvents (B1) which can be regarded as intermolecular amides, represented by the general formula (I) when $R^1$ and $R^2$ do not form a ring, and by formula (I"), and secondly solvents (B2) which are intramolecular cyclic amides, i.e. what are called lactams, which are represented by the general formula (I').

Among the intermolecular amides (B1) of the formula (I) in which $R^1$ and $R^2$ do not form a ring, preference is given to N,N-dialkylamides. Among these, preference is given to N,N-di-($C_{1-8}$-alkyl)amides, and especially N,N-di-($C_{1-6}$-alkyl)amides and most preferably N,N-di-($C_{1-4}$-alkyl)amides. The alkyl groups may be straight-chain or branched and are preferably straight-chain. Suitable parent carboxylic acids of the N,N-dialkylamides are $C_{1-24}$-monocarboxylic acids, preferably $C_{1-20}$-monocarboxylic acids, more preferably $C_{1-16}$-monocarboxylic acids and most preferably $C_{1-12}$-monocarboxylic acids, for example $C_{1-10}$-monocarboxylic acids. The monocarboxylic acids may be straight-chain, branched and mono- or polyunsaturated. The monocarboxylic acids are preferably straight-chain and saturated.

Among the intramolecular amides (B2) of the formula (I'), preference is given to those having 4 to 8, preferably 5 to 7, ring atoms. The ring atoms do not include any side chains present. For example, the compounds of the following formula (II):

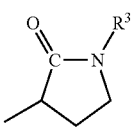

(II)

are compounds having 5 ring atoms, in which the $R^1$ and $R^2$ radicals form a common divalent $CH(CH_3)$—$CH_2$—$CH_2$ radical containing 4 carbon atoms.

Particularly preferred compounds of the formula (I') are those in which the ring system is a gamma-butyrolactam (i.e. pyrrolidone), a delta-valerolactam or epsilon-caprolactam. The ring systems may have one or more alkyl groups as substituents on a ring carbon atom, for example in gamma-valerolactam. The alkyl substituents are preferably methyl groups. Preferably, not more than one substituent is present on a ring carbon atom, especially a methyl substituent. Particular preference is given to the unsubstituted ring systems.

In the compounds of the formula (I'), preferred $R^3$ radicals are those which contain at least 6 carbon atoms. $R^3$ may be aliphatic or aromatic radicals or a combination of the two—as, for example, in the benzyl radical or in the propylimidazole radical. The aliphatic radicals may also be cycloaliphatic. The aromatic radicals may also contain heteroatoms. Particularly preferred purely aliphatic radicals are alkyl radicals having 6 to 11 carbon atoms, preferably alkyl radicals having 6 to 10 carbon atoms and most preferably alkyl radicals having 6 to 8 carbon atoms. The aforementioned alkyl radicals may be straight-chain or branched and are preferably straight-chain.

In a particular embodiment, 50% to 100% by weight of the solvent (B) of the general formula (I), based on the total weight of the solvent (B) is an intermolecular amide (B1) in which $R^1$ is a branched or unbranched, saturated or unsaturated, preferably saturated, hydrocarbyl radical containing 3 to 17, preferably 5 to 15, more preferably 7 to 13, even more preferably 7 to 12, carbon atoms;

$R^2$ and $R^3$ in each case are the same or different and are independently a branched or unbranched, saturated or unsaturated organic radical having 1 to 6, preferably 1 to 4, most preferably 1, carbon atom(s), or $R^2$ and $R^3$ are joined to one another by a chemical bond and, with inclusion of the nitrogen atom in the general formula (I), form a ring having 5 to 7 ring atoms.

Preferably, the $R^1$ radical is a branched or unbranched alkyl radical, the latter more preferably containing 7 to 12, most preferably 7 to 11, carbon atoms.

In a particularly preferred embodiment, $R^1$ is a branched or unbranched alkyl radical containing 7 to 11 carbon atoms, and $R^2$ and $R^3$ are each a methyl radical.

The preparation of the respective alkylamide compounds usable as solvent (B1) is effected, according to the structure type, by known methods of organic chemistry. For instance, the above-described structure types can be prepared by reacting an appropriate carboxylic acid, preferably alkylcarboxylic acid, with an appropriate amine; instead of the carboxylic acid, it is also possible to react reactive derivatives thereof, especially the anhydrides, esters and acid halides of the carboxylic acids, preferably of the alkylcarboxylic acids, with the amine. For instance, the preparation of compounds of this type is described, for example, in U.S. Pat. No. 3,417,114 A, U.S. Pat. No. 2,667,511 A, GB 719792 A, DE 875807, U.S. Pat. No. 3,288,794 A, U.S. Pat. No. 3,751,465 A, U.S. Pat. No. 3,674,851 A, U.S. Pat. No. 3,856,791 A, WO 2006033117 A2 and in Synthetic Communications 2000, 30, 4241.

In a further preferred embodiment, 50% to 100% by weight of the solvent (B) of the general formula (I), based on the total weight of the solvent (B), is an intramolecular amide (B2) in which $R^1$ and $R^2$ are joined to one another by a chemical bond and, with inclusion of the C(=O)N group, form a ring having 4 to 8, preferably 5 to 7, more preferably 5 or 6, most preferably 5, ring atoms, where one or more ring carbon atoms are optionally substituted by a $C_1$-$C_4$-alkyl radical, with the proviso that x+y+z≥8, preferably ≥9, more preferably ≥11, and $R^3$ contains at least 6 carbon atoms.

The preparation of the respective lactams usable as solvent (B2) is effected, according to the structure type, by known methods of organic chemistry. In a preferred preparation process, the above compounds are prepared by reacting alkyl-, aryl- or arylalkylamines with appropriate lactones.

For example, the preparation of such compounds is described in documents including U.S. Pat. No. 4,299,840 A, WO 1993017787 A1, U.S. Pat. No. 5,508,396 A, U.S. Pat. No. 5,986,092 A, U.S. Pat. No. 5,101,045 A, U.S. Pat. No. 3,767,644 A, U.S. Pat. No. 4,814,464 A, WO 1993016042 A1, and also in Tetrahedron Letters 1994, 35, 3313 and in Macromol. Chem. Phys. 1996, 197, 3123, in Drug Design and Discovery 1991, 8, 37 and in Studies in Surface Science and Catalysis 1997, 108, 115-122, and also in M. B. Smith, Houben-Weyl: Methods of Molecular Transformations, Category 3, Volume 21, Product Class 10: "gamma-Lactams and Larger Ring Lactams" (G. Thieme Verlag, Stuttgart/New York 2005, Volume Editor S. M. Weinreb). Lactams can also be prepared from ω-N-monoalkylaminocarboxylic acids by ring closure with elimination of water. Open-chain amides having at least one carbon-carbon double bond at each end of the molecule can likewise be used to synthesize lactams by ring-closing metathesis.

Organic Solvent (C)

The presence of a further solvent (C) other than (A), (B) and (D) can be advantageous. However, it is also possible to dispense with the solvent (C); this means that, in a particularly preferred embodiment of the urea preparations of the invention, (C) is not present. Preferably, the urea preparations of the invention contain less than 35% by weight, even more preferably less than 25% by weight, especially preferably less than 10% by weight and most preferably less than 5% by weight of solvent (C), based on the total weight of the urea preparations. If the solvent (C) is present, the proportion thereof is preferably 1% to 35% by weight, more preferably 1% to 25% by weight, most preferably 1% to 10% by weight, based on the total weight of the urea preparation of the invention. Useful solvents (C) are any organic solvents (C) known from the prior art that are chemically inert toward the further constituents of the urea preparation of the invention. The organic solvent (C) may especially be chosen with regard to the later field of application of the urea preparation. When an appropriate solvent (C) is chosen, it is thus possible that aspects such as the evaporation temperature under the later application conditions or the chemical and/or physical compatibility with the application systems may play a role. For instance, it is typically undesirable that the solvents (C) are chemically reactive toward the application systems into which the urea preparations are to be incorporated, or lead to the coagulation thereof. Like the solvents (B), the solvents (C) are also liquid, typically at 23° C. If solvents (C) are used, it is preferable that not more than three, more preferably not more than two, different solvents (C) are used. Most preferably, only one solvent (C) is used.

Preferably, the urea preparation is free of solvents (C).

The abovementioned percentage limits for the use of a solvent (C) apply irrespective of the number of different solvents (C) used.

Preferably, the solvents (C) are chosen from the group consisting of aliphatic hydrocarbons, cycloaliphatic hydrocarbons, terpenes, terpenoids, aromatic hydrocarbons, hydrochlorocarbons, alcohols, ketones, esters, glycol ethers, ethers, amides, sulfoxides, sulfones, acetals and nitroalkanes. Examples of suitable solvents covered by the aforementioned umbrella terms are given in Kittel, Lehrbuch der Lacke und Beschichtungen [Textbook of Varnishes and Coatings], volume 4 "Lösemittel, Weichmacher und Additive" [Solvents, Plasticizers and Additives], second edition, S. Hirzel Verlag Stuttgart, 2007, especially in table 4.1.23 on pages 81-85.

Preferably, the solvents (C) have molar masses of 32 to 300 g/mol, preferably to about 250 g/mol, more preferably from 32 to about 200 g/mol.

Most preferably, the solvents are monomeric compounds.

Salts (D)

In one embodiment of the invention, the composition of the invention contains 0.5% to 4% by weight of a salt (D), where 50% to 100% by weight, preferably 100% by weight, of the salt (D) is an alkali metal salt or alkaline earth metal salt or an ammonium salt, preferably a lithium, calcium or magnesium salt, more preferably a lithium or calcium salt, having, as anion, preferably a monovalent anion, especially preferably a halide, pseudohalide, formate, acetate and/or nitrate, most preferably a chloride, acetate and/or nitrate, as counterion. Particular preference is given to lithium salts.

The salts also include so called ionic liquids. Ionic liquids are understood in the context of the present invention to mean organic salts or mixtures of organic salts having melting points below 80° C., preferably melting points below 50° C., more preferably below 30° C. and most preferably below 20° C. The ionic liquids that are particularly preferred herein are liquid at room temperature. Ionic liquids usable as salts (D) with particular preference are, for example, the ionic liquids described in WO 2010/063358 A1.

If the composition contains, as salt (D), an ionic liquid, the latter is preferably present in an amount of 5% to 50% by weight.

Component (E)

As well as the abovementioned components (A), (B), (C) and (D), one or more components (E) other than these components may be present. It is generally the case that all components that are not covered by the definitions of (A), (B), (C) and (D) can be regarded as component (E).

These components may, for example, be further monomeric, oligomeric or polymeric substances (E).

Preferably 0% to a maximum of 20% by weight, particularly preferably 0% to 10% by weight, more preferably 0% to 5% by weight and most preferably 0% to 3% by weight of components (E) are present, based on the total weight of the urea preparation. Preferably, the urea preparation is free of component (E).

In a preferred embodiment, the urea preparation of the invention consists, based in each case on the total weight of the urea preparation, of
  i. 10% to 65% by weight of (A),
  ii. 20% to 85% by weight of (B),
  iii. 0% to 35% by weight of (C),
  iv. 0.5% to 4% by weight of (D) when (D) is one or more alkali metal or alkaline earth metal salts or an ammonium salt with a monovalent anion selected from the group of the halides, pseudohalides, formates, acetates and/or nitrates, or
    5% to 50% by weight of (D) when (D) is an ionic liquid,
  v. 0% to 20% by weight of (E).

In a particularly preferred embodiment, the urea preparation of the invention consists, based in each case on the total weight of the urea preparation, of
  i. 15% to 60% by weight of (A),
  ii. 30% to 80% by weight of (B),
  iii. 0% to 25% by weight of (C),
  iv. 0.5% to 4% by weight of (D) when (D) is one or more alkali metal or alkaline earth metal salts or an ammonium salt with a monovalent anion selected from the group of the halides, pseudohalides, formates, acetates and/or nitrates, or
    5% to 50% by weight of (D) when (D) is an ionic liquid,
  v. 0% to 10% by weight of (E).

In a very particularly preferred embodiment, the urea preparation of the invention consists, based in each case on the total weight of the urea preparation, of
  i. 20% to 55% by weight of (A),
  ii. 35% to 75% by weight of (B),
  iii. 0% to 25% by weight of (C),
  iv. 0.5% to 4% by weight of (D) when (D) is one or more alkali metal or alkaline earth metal salts or an ammonium salt with a monovalent anion selected from the group of the halides, pseudohalides, formates, acetates and/or nitrates, or
    5% to 50% by weight of (D) when (D) is an ionic liquid,
  v. 0% to 5% by weight of (E).

For all the aforementioned embodiments, especially the preferred, particularly preferred and very particularly preferred embodiments, it is preferable that components (C) or (E), especially (C) and (E), are not present.

For all the aforementioned embodiments, especially the preferred, particularly preferred and very particularly preferred embodiments, it is preferable that components (C) as species contain exclusively organic solvents having a molecular weight of up to 300 g/mol.

For all the aforementioned embodiments, especially the preferred, particularly preferred and very particularly preferred embodiments, it is preferable that the urea species present in components (A) have a weight-average molecular weight, determined by means of GPC, of less than 60 000 g/mol, more preferably of less than 40 000 g/mol. Most preferably, the weight-average molecular weight is less than 10 000 g/mol.

For all the aforementioned embodiments, especially the preferred, particularly preferred and very particularly preferred embodiments, component (E), if present and if it contains species containing hydroxyl groups, the hydroxyl number of the species is preferably less than 15 mg KOH/g. In that case, preferably not more than one hydroxyl group is present in the respective species. Most preferably, component (E) does not contain any species containing hydroxyl groups.

For all the aforementioned embodiments, especially the preferred, particularly preferred and very particularly preferred embodiments, it is preferable that component (E) is free of what are called crosslinking agents. Crosslinking agents in the context of this invention are especially polyisocyanates having free or blocked isocyanate groups, amino resins, for example melamine resins, urea-formaldehyde resins and benzoguanamine resins, polyamines and polyepoxides.

Urea Preparations of the Invention

The urea preparation of the invention may, as detailed above, as well as the constituents (A), (B), (C) and (D), also contain the aforementioned further constituents (E), and in such a case preferably consists of constituents (A), (B), (C), (D) and (E), with (C), (D) and (E) being optional. The urea preparation of the invention may thus also consist of constituents (A), (B), (C) and (D). In a preferred embodiment, it consists of (A), (B) and (C) or especially (A), (B) and (D), and in a very particularly preferred embodiment of (A) and (B). The aforementioned preferred and particularly preferred combinations of the constituents are independent of the specific execution of the individual components.

The urea preparations of the invention preferably contain neither pigments nor fillers. Irrespective of this, the urea preparations of the invention preferably contain less than 5% by weight, more preferably less than 3% by weight and most preferably less than 1% by weight of water, based on the total weight of the urea preparation. Most preferably, the urea preparations are essentially anhydrous.

Since the urea preparations of the invention typically have good storage stability, the constituents present therein are preferably chemically inert with respect to one another. This is especially true of components (A), (B), (C), (D) and (E) among one another.

The total weight of the sum total of the components (A) and (B) present obligatorily in the urea preparations of the invention is at least 20% by weight, preferably at least 30% by weight, more preferably at least 45% by weight and most preferably at least 60% by weight, based on the total weight of the urea preparation of the invention. An especially preferred case is that the total weight of the sum total of components (A) and (B) is at least 80% by weight or even at least 90% by weight based on the total weight of the urea compound of the invention.

Fields of Application of the Urea Preparations of the Invention

The urea preparations of the invention are preferentially suitable for rheology control, especially for thixotropy, of liquid systems.

The invention also relates to the use of the urea preparations of the invention for rheology control, especially for thixotropy, of a liquid mixture. This liquid mixture preferably takes the form of a coating, especially of a varnish, of a polymer formulation, of a pigment paste, of a sealant formulation, of a cosmetic, of a ceramic formulation, of an adhesive formulation, of a potting compound, of a building material formulation, of a lubricant, of a spackling compound, in the form of a spray agent (for example of what is called a deposition aid in crop protection products), of a printing ink or of another ink, for example of an inkjet ink.

Finally, the present invention relates to a liquid medium which takes the form of a coating material, of a polymer formulation, of a pigment paste, of a sealant formulation, of a cosmetic, of a ceramic formulation, of an adhesive formulation, of a potting compound, of a building material formulation, of a lubricant, of a spackling compound, of a printing ink or of another ink, and which contains 0.1% to 7.5% by weight of the urea preparation of the invention, based on the total weight of the formulation, i.e. the total weight of liquid medium and the urea preparation. A particularly preferred embodiment of the invention relates to a liquid medium (i.e. a formulation) containing 0.2% to 5% by weight, more preferably 0.3% to 4% by weight, based on the total weight of liquid medium and the urea preparation of the invention.

Particular preference is given here to the use of the urea preparation of the invention as rheology control agent, preferably as thixotropic agent, for rheology control of varnishes, printing inks, other inks (for example inkjet inks), polymer formulations, cosmetic preparations, building material formulations, lubricants and/or adhesives, and in formulations that are used in natural gas and mineral oil production.

The varnishes, printing inks and other inks, especially inkjet inks, may either be solvent-containing or solvent-free or water-based varnishes, printing inks and other inks, especially inkjet inks. Varnishes are usable in a wide variety of different fields of application, including the sector of automobile varnishes, construction varnishes, protective varnishes, including for painting of ships and bridges, can- and coil-coating varnishes, wood and furniture varnishes, industrial varnishes, varnishes for painting of plastics, wire varnishes, coating materials for coating of food and drink products and seed, and also in the form of what are called color resists, which are used for color filters, for example in liquid-crystal displays. The field of use of varnishes also includes pasty materials which generally have a very high proportion of solids and a low proportion of liquid components, for example what are called pigment pastes or else pastes based on finely divided metal particles or metal powders, for example those based on silver, copper, zinc, aluminum, bronze and brass.

The polymer formulations may be the (liquid) starting materials for production of polymer materials, which are preferably converted by a chemical crosslinking process ("curing" to give a thermoset). Preferred polymer preparations are therefore unsaturated polyester resins, vinyl ester resins, acrylate resins, epoxy resins, polyurethane resins, formaldehyde resins (such as melamine-formaldehyde or urea-formaldehyde). These can be cured under a wide variety of different conditions, for example at room temperature (cold-curing systems) or at elevated temperature (hot-curing systems), optionally also on the application of pressure ("closed mold" application, sheet molding compound or bulk molding compound). The preferred polymer formulations also include PVC plastisols.

The cosmetic preparations may be diverse liquid compositions that are used in the personal care or else healthcare sector, for example lotions, creams, pastes, for example toothpaste, foams, for example shaving foam, gels, for example shaving gel, shower gel or medicaments formulated in gel form, hair shampoo, liquid soaps, nail varnishes, lipsticks and hair dyes.

In the case of the spray agents (as deposition aids), the use of the rheology control agents of the invention puts the emphasis on drift reduction or drift avoidance.

The construction material formulations may be materials that are liquid or pasty on processing, which are used in the construction sector and which solidify after curing, for example hydraulic binders such as concrete, cement, mortar, tile adhesive and gypsum.

The lubricants are agents which are used for lubrication, i.e. serve for reduction of friction and wear, and for force transmission, cooling, vibration damping, sealing and corrosion protection, preference being given here to liquid lubricants and lubricating greases. Glidants and drilling fluids (as used in mineral oil production) are also among the lubricants by definition.

The adhesives may be any process materials that are liquid under processing conditions and which can join adherends by virtue of areal bonding and internal strength. Adhesives may be solvent-containing, solvent-free or water-based.

The present invention is additionally to be elucidated in detail hereinafter by examples.

EXAMPLES

Determination of Molecular Weight:

The weight-average molecular weight is the weight-average of the molar mass distribution determined by means of gel permeation chromatography (GPC). The molar mass distribution is determined according to DIN 55672 Part 2. The eluent used is a solution of lithium bromide (content 5 g/L) in dimethylacetamide. Calibration is accomplished using narrow-distribution polymethyl-methacrylate standards of linear structure having molecular weights between 1 000 000 and 102 g/mol. The temperature of the overall GPC system (injector, sample plate, detectors and columns) is 80° C.

Amine numbers were determined according to DIN 16945. The anhydride number (AAN) is understood to mean the amount of KOH in mg that corresponds to the neutralization of one carboxyl group of the anhydride in 1 g of substance. For this purpose, the anhydride is first reacted with n-butylamine to give the carboxylic acid and to give the acid amide. The excess amine is back-titrated with HCl in isopropanol; the anhydride number can be calculated directly from the amine consumed.

Refractive indices were determined at 20° C. according to DIN 51423.

The density was determined at 20° C. according to DIN EN ISO 2811, Part 3.

Solids

The solids reported are theoretical solids which are not determined experimentally but merely calculated from the starting weight of the components used.

Preparation of N-alkylamides

Example 1 a ($R^1$=Methyl, $R^2$=$R^3$=n-butyl)

A reaction vessel (round-bottom flask with stirrer, dropping funnel and reflux condenser) was initially charged under a nitrogen atmosphere with 425.7 g (3.3 mol) of dibutylamine. While stirring, 306 g (3.0 mol) of acetic anhydride are slowly added dropwise. The reaction was strongly exothermic. By cooling with a water bath, the temperature was kept at 80° C. After the addition had ended, the mixture was heated up to 140° C. and boiled under reflux for 2 h. After the reaction time had ended, the reaction mixture had an amine number of 21.7 mg KOH/g and an anhydride acid number of 0.5 mg KOH/g. Subsequently, a water separator was installed into the apparatus and the acetic acid formed was distilled off at 140° C. and under a reduced pressure of 180 mbar. After distillation, the amine number was 8.9 mg KOH/g. The reaction product was purified by distillation by means of a thin-film evaporator at 120° C. and <1 mbar.

Example 2 a ($R^1$=$R^2$=$R^3$=n-butyl)

A reaction vessel (round-bottom flask with stirrer, dropping funnel and reflux condenser) was initially charged under a nitrogen atmosphere with 336.0 g (3.3 mol) of valeric acid. Gradually and while stirring, 467.0 g (3.6 mol) of dibutylamine are added dropwise. Subsequently, 1.6 g of p-toluenesulfonic acid were added and the mixture was heated to 170° C. The reaction mixture was boiled under reflux for 2 hours. After the reaction time had ended, the reaction mixture had an amine number of 23.7 mg KOH/g. Lastly, a water separator was connected and the water of reaction and the excess dibutylamine were distilled off at 170° C. and under a reduced pressure of 180 mbar within 5 hours. The reaction product was purified by distillation by means of a thin-film evaporator at 120° C. and <1 mbar. The amine number thereafter was <1 mg KOH/g.

Example 3 a ($R^1$-$R^2$=$CH_2$—$CH_2$—$CH_2$, $R^3$=n-hexyl)

A reaction vessel (round-bottom flask with stirrer, reflux condenser, water separator and dropping funnel) was initially charged under a nitrogen atmosphere at 60° C. with 121.0 g (1.2 mol) of n-hexylamine. Within 45 minutes, 86.0 g (1.0 mol) of butyrolactone were added dropwise while stirring. In the course of this, the temperature rose to 75° C. The temperature was increased to 110° C. for 2 hours, then to 200° C. for 4 hours, then to 230° C. for 7 hours, in the course of which the water of reaction formed was distilled off continuously. After the reaction time had ended, a clear orange liquid having an amine number of 4.5 mg KOH/g and a hydroxyl number of 12.4 mg KOH/g had formed. The reaction product was purified by distillation by means of a thin-film evaporator at 120° C. and <1 mbar.

Example 4 a ($R^1$-$R^2$=$CH_2$—$CH_2$—$CH_2$, $R^3$=n-pentyl)

A reaction vessel (round-bottom flask with stirrer, reflux condenser, water separator and dropping funnel) was initially charged under a nitrogen atmosphere at 60° C. with 104.4 g (1.2 mol) of n-pentylamine. Within 35 minutes, 86.0 g (1.0 mol) of butyrolactone were added dropwise while stirring. In the course of this, the temperature rose to 80° C. The temperature was increased to 110° C. for 2 hours, then to 200° C. for 4 hours, then to 230° C. for 7 hours, in the course of which the water of reaction formed was distilled off continuously. After the reaction time had ended, yellow-brownish liquid of low viscosity and having an amine number of 4.5 mg KOH/g had formed. The reaction product was purified by distillation by means of a thin-film evaporator at 120° C. and <1 mbar. The amine number thereafter was <1 mg KOH/g.

Example 5 a ($R^1$-$R^2$=$CH_2$—$CH_2$—$CH_2$, $R^3$=Benzyl)

A reaction vessel (round-bottom flask with stirrer, reflux condenser, water separator and dropping funnel) was initially charged under a nitrogen atmosphere at 60° C. with 0.38 g of dibutyltin dilaurate and 107.0 g (1.0 mol) of benzylamine. Within 30 minutes, 86.0 g (1.0 mol) of butyrolactone were added dropwise while stirring. In the course of this, the temperature rose to 100° C. The temperature was increased to 170° C. for 2 hours, then to 240° C. for 11 hours, in the course of which the water of reaction formed was distilled off continuously. After the reaction time had ended, a yellow liquid of low viscosity and having an amine number of 12.7 mg KOH/g had formed. The reaction product was purified by distillation by means of a thin-film evaporator at 120° C. and <1 mbar. The amine number thereafter was <1 mg KOH/g.

Example 6 a ($R^1$-$R^2$=$CH_2$—$CH_2$—$CH_2$—$CH_2$—$CH_2$, $R^3$=n-butyl)

A reaction vessel (round-bottom flask with stirrer, reflux condenser, water separator and dropping funnel) was initially charged under a nitrogen atmosphere at 60° C. with 0.37 g of p-toluenesulfonic acid and 73.0 g (1.0 mol) of n-butylamine. Within 45 minutes, 114.0 g (1.0 mol) of caprolactone were added dropwise while stirring. In the course of this, the temperature rose to 85° C.

The temperature was increased to 120° C. for 2 hours, then to 140° C. for 2 hours, then to 230° C. for 8 hours, in the course of which the water of reaction formed was distilled off continuously.

The resultant liquid product had an amine number of 4.7 mg KOH/g and a viscosity of 566 mPas.

Example 7 a ($R^1$-$R^2$=$CH_2$—$CH_2$—$CH_2$—$CH_2$—$CH_2$, $R^3$=n-hexyl)

A reaction vessel (round-bottom flask with stirrer, reflux condenser, water separator and dropping funnel) was initially charged under a nitrogen atmosphere at 60° C. with 0.49 g of p-toluenesulfonic acid and 131.0 g (1.29 mol) of n-hexylamine. Within 55 minutes, 114.0 g (1.0 mol) of caprolactone were added dropwise while stirring. In the course of this, the temperature rose to 80° C. The temperature was increased to 140° C. for 2 hours, then to 230° C. for 11 hours, in the course of which the water of reaction formed was distilled off. The resultant waxy product had an amine number of 15.9 mg KOH/g.

Example 8 a ($R^1$-$R^2$=$CH(CH_3)$—$CH_2$—$CH_2$, $R^3$=n-hexyl)

A reaction vessel (round-bottom flask with stirrer, reflux condenser, water separator and dropping funnel) was initially charged under a nitrogen atmosphere at 60° C. with 52.0 g (0.51 mol) of n-hexylamine. Within 25 minutes, 51.5 g (0.51 mol) of gamma-valerolactone were added dropwise while stirring. In the course of this, the temperature rose to 80° C. The temperature was increased to 140° C. for 2 hours, then to 230° C. for 10 hours, in the course of which the water of reaction formed was distilled off. A brownish liquid of low viscosity was obtained.

Example 9 a (R$^1$-R$^2$=CH(CH$_3$)—CH$_2$—CH$_2$, R$^3$=n-butyl)

A reaction vessel (round-bottom flask with stirrer, reflux condenser, water separator and dropping funnel) was initially charged under a nitrogen atmosphere at 60° C. with 73.0 g (1.0 mol) of n-butylamine. Within 45 minutes, 100.0 g (1.0 mol) of gamma-valerolactone were added dropwise while stirring. In the course of this, the temperature rose to 80° C. The temperature was increased to 140° C. for 2 hours, then to 230° C. for 10 hours, in the course of which the water of reaction formed was continuously distilled off. Brownish liquid having an amine number of 5.5 mg KOH/g was obtained. The refractive index was 1.4747 and the viscosity was 3 mPas.

Example 10 a (Noninventive; R$^1$-R$^2$=CH$_2$—CH$_2$—CH$_2$, R$^3$=n-butyl)

A reaction vessel (round-bottom flask with stirrer, reflux condenser, water separator and dropping funnel) was initially charged under a nitrogen atmosphere with 222.2 g (3.0 mol) of n-butylamine. Within 45 minutes, 172.0 g (2.0 mol) of butyrolactone were added dropwise while stirring. In the course of this, the temperature rose to 80° C. The temperature was increased to 140° C. for 2 hours, then to 230° C. for 10 hours, in the course of which the water of reaction formed and the excess amine were continuously distilled off. Brownish liquid having an amine number of 3.7 mg KOH/g was obtained. The density was 0.96 g/cm$^3$.

Example 11 a (R$^1$-R$^2$=CH$_2$—CH$_2$—CH$_2$, R$^3$=CH$_2$—CH$_2$—CH$_2$-imidazole)

A reaction vessel (round-bottom flask with stirrer, reflux condenser, water separator and dropping funnel) was initially charged under a nitrogen atmosphere at 80° C. with 125.0 g (1.0 mol) of aminopropylimidazole. Within 45 minutes, 94.7 g (1.1 mol) of butyrolactone were added dropwise while stirring. The temperature was increased using a temperature ramp of 10° C. every 20 minutes up to the final temperature of 250° C. Thereafter, the temperature was kept at 250° C. for 6 h. Over the entire reaction time, the water of reaction formed was distilled off. 0.4 g of p-toluenesulfonic acid was added and water was separated out at 250° C. for a further 2 hours. The reaction product is liquid and very dark in color.

Example 12 a (Noninventive; R$^1$-R$^2$=CH$_2$—CH$_2$—CH$_2$, R$^3$=n-propyl)

A stirred autoclave was initially charged with 60.0 g (1 mol) of n-propylamine and heated to 60° C. Within 45 minutes, 86.0 g (1 mol) of butyrolactone were added while stirring. The temperature at first rose to 95° C. Subsequently, the mixture is stirred at 90° C. for another 4 hours. Thereafter, the reaction mixture is transferred into a round-bottom flask with stirrer, reflux condenser, water separator and dropping funnel, and heated to 110° C. While stirring, the temperature was then increased by 15° C. per hour. Reaction was additionally continued at 200° C. for 10 hours. Over the entire reaction time, the water of reaction formed was distilled off.

Pale yellow liquid having an amine number of 4 mg KOH/g was obtained. The reaction product was purified by distillation by means of a thin-film evaporator at 120° C. and a pressure of <1 mbar.

Preparation of the Urea Preparations

Product Example a1

Stage 1:
First of all, 64.4 g of a diisocyanate monoadduct are prepared according to patent specification EP 1188779 from a polyethylene glycol monobutyl ether having a hydroxyl number of 220 mg KOH/g (determined according to DIN/ISO 4629) and a mixture of 35% tolylene 2,4-diisocyanate and 65% tolylene 2,6-diisocyanate.

Stage 2:
A four-neck flask is provided with a stirrer, dropping funnel, thermometer and reflux condenser. 118.2 g of N-n-octylbutyrolactam (Sigma-Aldrich) are initially charged and heated to 120° C. while stirring under a nitrogen atmosphere. 4.2 g of lithium chloride are added and dissolved at this temperature while stirring within 1 hour. Subsequently, temperature is lowered to 80° C. 10.2 g of m-xylylenediamine are added and the mixture is homogenized. The isocyanate adduct prepared previously (stage 1) is added dropwise to the amine solution while stirring within 1 hour at a rate sufficiently slow that the temperature does not exceed 85° C. To complete the reaction, the reaction mixture is stirred at 80° C. for another 3 hours. A clear, colorless and slightly viscous product is obtained. The amine number is below 1.0 mg KOH/g (determined according to DIN 16945). The product contains 38% by weight of urea component.

Product Example a2

Stage 1
First of all, 64.4 g of a diisocyanate monoadduct are prepared according to patent specification EP 1188779 from a polyethylene glycol monobutyl ether having a hydroxyl number of 220 mg KOH/g (determined according to DIN/ISO 4629) and a mixture of 35% tolylene 2,4-diisocyanate and 65% tolylene 2,6-diisocyanate.

Stage 2
A four-neck flask is provided with a stirrer, dropping funnel, thermometer and reflux condenser. 118.2 g of 1-benzylpyrrolidin-2-one (example 5a) are initially charged and heated to 120° C. while stirring under a nitrogen atmosphere. 4.2 g of lithium chloride are added and dissolved at this temperature while stirring within 1 hour. Subsequently, temperature is lowered to 80° C. 10.2 g of m-xylylenediamine are added and the mixture is homogenized. The isocyanate adduct prepared previously (stage 1) is added dropwise to the amine solution while stirring within 1 hour at a rate sufficiently slow that the temperature does not exceed 85° C. To complete the reaction, the reaction mixture is stirred at 80° C. for another 3 hours. A slightly cloudy, yellow, viscous product is obtained. The amine number is 1 mg KOH/g (determined according to DIN 16945). The product contains 38% by weight of urea component.

Product Example a3 (Noninventive)

Stage 1
First of all, 64.4 g of a diisocyanate monoadduct are prepared according to patent specification EP 1188779 from a polyethylene glycol monobutyl ether having a hydroxyl number of 220 mg KOH/g (determined according to DIN/ISO 4629) and a mixture of 35% tolylene 2,4-diisocyanate and 65% tolylene 2,6-diisocyanate.

Stage 2

A four-neck flask is provided with a stirrer, dropping funnel, thermometer and reflux condenser. 64.5 g of 1-propylpyrrolidin-2-one (example 12a) are initially charged and heated to 120° C. while stirring under a nitrogen atmosphere. 5.1 g of lithium chloride are added and dissolved at this temperature while stirring within 1 hour. Subsequently, temperature is lowered to 80° C. 10.2 g of m-xylylenediamine are added and the mixture is homogenized. The isocyanate adduct prepared previously (stage 1) is added dropwise to the amine solution while stirring within 1 hour at a rate sufficiently slow that the temperature does not exceed 85° C. To complete the reaction, the reaction mixture is stirred at 80° C. for another 3 hours. A slightly cloudy, yellowish and viscous product is obtained. The amine number is 5.2 mg KOH/g (determined according to DIN 16945). The product contains 52% by weight of urea component.

Product Example a4 (Noninventive)

Stage 1

First of all, 64.4 g of a diisocyanate monoadduct are prepared according to patent specification EP 1188779 from a polyethylene glycol monobutyl ether having a hydroxyl number of 220 mg KOH/g (determined according to DIN/ISO 4629) and a mixture of 35% tolylene 2,4-diisocyanate and 65% tolylene 2,6-diisocyanate.

Stage 2

A four-neck flask is provided with a stirrer, dropping funnel, thermometer and reflux condenser. 118.2 g of 1-pentylpyrrolidin-2-one (example 4a) are initially charged and heated to 120° C. while stirring under a nitrogen atmosphere. 4.2 g of lithium chloride are added and dissolved at this temperature while stirring within 1 hour. Subsequently, temperature is lowered to 80° C. 10.2 g of m-xylylenediamine are added and the mixture is homogenized. The isocyanate adduct prepared previously (stage 1) is added dropwise to the amine solution while stirring within 1 hour at a rate sufficiently slow that the temperature does not exceed 85° C. To complete the reaction, the reaction mixture is stirred at 80° C. for another 3 hours. The amine number is 3.6 mg KOH/g (determined according to DIN 16945). The product contains 38% by weight of urea component.

Product Example a5

Stage 1

First of all, 64.4 g of a diisocyanate monoadduct are prepared according to patent specification EP 1188779 from a polyethylene glycol monobutyl ether having a hydroxyl number of 220 mg KOH/g (determined according to DIN/ISO 4629) and a mixture of 35% tolylene 2,4-diisocyanate and 65% tolylene 2,6-diisocyanate.

Stage 2

A four-neck flask is provided with a stirrer, dropping funnel, thermometer and reflux condenser. 118.2 g of 1-hexylpyrrolidin-2-one (example 3a) are initially charged and heated to 120° C. while stirring under a nitrogen atmosphere. 4.2 g of lithium chloride are added and dissolved at this temperature while stirring within 1 hour. Subsequently, temperature is lowered to 80° C. 10.2 g of m-xylylenediamine are added and the mixture is homogenized. The isocyanate adduct prepared previously (stage 1) is added dropwise to the amine solution while stirring within 1 hour at a rate sufficiently slow that the temperature does not exceed 85° C. To complete the reaction, the reaction mixture is stirred at 80° C. for another 3 hours. The amine number is 3.6 mg KOH/g (determined according to DIN 16945). The product contains 38% by weight of urea component.

Product Example a6

Stage 1

First of all, 64.4 g of a diisocyanate monoadduct are prepared according to patent specification EP 1188779 from a polyethylene glycol monobutyl ether having a hydroxyl number of 220 mg KOH/g (determined according to DIN/ISO 4629) and a mixture of 35% tolylene 2,4-diisocyanate and 65% tolylene 2,6-diisocyanate.

Stage 2

A four-neck flask is provided with a stirrer, dropping funnel, thermometer and reflux condenser. 239.1 g of a mixture of N,N-dimethyloctanamide and N,N-dimethyldecanamide (from BASF, Agnique AMD810) are initially charged and heated to 120° C. while stirring under a nitrogen atmosphere. 5.1 g of lithium chloride are added and dissolved at this temperature while stirring within 1 hour. Subsequently, temperature is lowered to 80° C. 10.2 g of m-xylylenediamine are added and the mixture is homogenized.

The isocyanate adduct prepared previously (stage 1) is added dropwise to the amine solution while stirring within 1 hour at a rate sufficiently slow that the temperature does not exceed 85° C. To complete the reaction, the reaction mixture is stirred at 80° C. for another 3 hours. A cloudy, colorless and slightly viscous product is obtained. The amine number is below 2 mg KOH/g (determined according to DIN 16945). The product contains 23% by weight of urea component.

Product Example a7

Stage 1

First of all, 64.4 g of a diisocyanate monoadduct are prepared according to patent specification EP 1188779 from a polyethylene glycol monobutyl ether having a hydroxyl number of 220 mg KOH/g (determined according to DIN/ISO 4629) and a mixture of 35% tolylene 2,4-diisocyanate and 65% tolylene 2,6-diisocyanate.

Stage 2

A four-neck flask is provided with a stirrer, dropping funnel, thermometer and reflux condenser. 239.1 g of dibutylacetamide (example 1a) are initially charged and heated to 120° C. while stirring under a nitrogen atmosphere. 5.1 g of lithium chloride are added and dissolved at this temperature while stirring within 1 hour. Subsequently, temperature is lowered to 80° C. 10.2 g of m-xylylenediamine are added and the mixture is homogenized. The isocyanate adduct prepared previously (stage 1) is added dropwise to the amine solution while stirring within 1 hour at a rate sufficiently slow that the temperature does not exceed 85° C. To complete the reaction, the reaction mixture is stirred at 80° C. for another 3 hours. A cloudy, colorless and slightly viscous product is obtained. The amine number is below 2 mg KOH/g (determined according to DIN 16945). The product contains 23% by weight of urea component.

Product Example a8

Stage 1

First of all, 93.6 g of a monoadduct are prepared according to patent specification EP 1188779 from a polyethylene glycol monomethyl ether having a molar mass of 450 g/mol and a mixture of 35% tolylene 2,4-diisocyanate and 65% tolylene 2,6-diisocyanate.

Stage 2

In a four-neck flask with a stirrer, dropping funnel, thermometer and reflux condenser, 252.0 g of a mixture of N,N-dimethyloctanamide and N,N-dimethyldecanamide (BASF, Agnique AMD810) are heated to 100° C. and, on attainment of the temperature, 4.2 g of lithium chloride are added. The lithium chloride is then dissolved at 100° C. while stirring within 1 hour. Subsequently, the temperature is lowered to 80° C. 10.2 g of m-xylylenediamine are added and the mixture is homogenized. The isocyanate adduct prepared previously (stage 1) is added dropwise to the amine solution while stirring within 1 hour at a rate sufficiently slow that the temperature does not exceed 85° C. To complete the reaction, the reaction mixture is stirred at 80° C. for 3 hours. A slightly cloudy and slightly viscous product is obtained. The product contains 29% by weight of urea component.

Product Example a9

Stage 1

First of all, 93.6 g of a monoadduct are prepared according to patent specification EP 1188779 from a polyethylene glycol monomethyl ether having a molar mass of 450 g/mol and a mixture of 35% tolylene 2,4-diisocyanate and 65% tolylene 2,6-diisocyanate.

Stage 2

In a four-neck flask with a stirrer, dropping funnel, thermometer and reflux condenser, 252.0 g of dibutylacetamide (example 1a) are heated to 100° C. and, on attainment of the temperature, 4.2 g of lithium chloride are added. The lithium chloride is then dissolved at 100° C. while stirring within 1 hour. Subsequently, the temperature is lowered to 80° C. 10.2 g of m-xylylenediamine are added and the mixture is homogenized. The isocyanate adduct prepared previously (stage 1) is added dropwise to the amine solution while stirring within 1 hour at a rate sufficiently slow that the temperature does not exceed 85° C. To complete the reaction, the reaction mixture is stirred at 80° C. for 3 hours. A cloudy and slightly viscous product is obtained. The product contains 29% by weight of urea component.

Product Example a10

Stage 1

First of all, 93.6 g of a monoadduct are prepared according to patent specification EP 1188779 from a polyethylene glycol monomethyl ether having a molar mass of 450 g/mol and a mixture of 35% tolylene 2,4-diisocyanate and 65% tolylene 2,6-diisocyanate.

Stage 2

In a four-neck flask with a stirrer, dropping funnel, thermometer and reflux condenser, 162.0 g of N-benzylpyrrolidone (example 5a) are heated to 100° C. and, on attainment of the temperature, 4.2 g of lithium chloride are added. The lithium chloride is then dissolved at 100° C. while stirring within 1 hour. Subsequently, the temperature is lowered to 80° C. 10.2 g of m-xylylenediamine are added and the mixture is homogenized. The isocyanate adduct prepared previously (stage 1) is added dropwise to the amine solution while stirring within 1 hour at a rate sufficiently slow that the temperature does not exceed 85° C. To complete the reaction, the reaction mixture is stirred at 80° C. for 3 hours. A clear, reddish-colored and viscous product is obtained. The product contains 38% by weight of urea component.

Product Example a11

Stage 1

First of all, 93.6 g of a monoadduct are prepared according to patent specification EP 1188779 from a polyethylene glycol monomethyl ether having a molar mass of 450 g/mol and a mixture of 35% tolylene 2,4-diisocyanate and 65% tolylene 2,6-diisocyanate.

Stage 2

In a four-neck flask with a stirrer, dropping funnel, thermometer and reflux condenser, 162.0 g of N-n-octyl-butyrolactam (Sigma-Aldrich) are heated to 100° C. and, on attainment of the temperature, 4.2 g of lithium chloride are added. The lithium chloride is then dissolved at 100° C. while stirring within 1 hour. Subsequently, the temperature is lowered to 80° C. 10.2 g of m-xylylenediamine are added and the mixture is homogenized. The isocyanate adduct prepared previously (stage 1) is added dropwise to the amine solution while stirring within 1 hour at a rate sufficiently slow that the temperature does not exceed 85° C. To complete the reaction, the reaction mixture is stirred at 80° C. for 3 hours. A clear, yellowish product is obtained. The product contains 38% by weight of urea component.

Product Example a12

Stage 1

First of all, a monoadduct is prepared according to patent specification EP 1188779 from tolylene 2,4-diisocyanate (Desmodur T100, Bayer) and lauryl alcohol.

Stage 2

In a reaction vessel (round-bottom flask with a stirrer, reflux condenser and dropping funnel), 1.7 g (0.039 mol) of LiCl are dissolved in 75 g of N-n-octyl-butyrolactam (Sigma-Aldrich) under a nitrogen atmosphere and while stirring. Thereafter, 3.6 g (0.026 mol) of meta-xylylenediamine are added and the clear mixture is heated to 80° C. Subsequently, 19.8 g (0.052 mol) of the monoadduct formed from Desmodur T100 and 1-dodecanol are added dropwise while stirring within 1 hour, at such a rate that the temperature does not rise above 85° C. To complete the reaction, the reaction mixture is stirred at 80° C. for 3 hours. A clear and fluid product is obtained. The proportion of the urea component in the product obtained is 23% by weight.

Product Example a13

Stage 1

First of all, a monoadduct is prepared according to patent specification EP 1188779 from tolylene 2,4-diisocyanate (Desmodur T100, Bayer) and lauryl alcohol.

Stage 2

In a reaction vessel (round-bottom flask with a stirrer, reflux condenser and dropping funnel), 12.6 g (0.3 mol) of LiCl are dissolved in 279 g of N-benzyl-butyrolactam (example 5a) under a nitrogen atmosphere and while stirring. Thereafter, 17.0 g (0.125 mol) of meta-xylylenediamine are added and the clear mixture is heated to 80° C. Subsequently, 90.0 g (0.25 mol) of the monoadduct formed from Desmodur T100 and 1-dodecanol are added dropwise while stirring within 1 hour, at such a rate that the temperature does not rise above 85° C. To complete the reaction, the reaction mixture is stirred at 80° C. for 3 hours. A yellow and viscous product is obtained. The proportion of the urea component in the product obtained is 27% by weight.

Product Example a14

Stage 1

First of all, a monoadduct is prepared according to patent specification EP 1188779 from tolylene 2,4-diisocyanate (Desmodur T100, Bayer) and lauryl alcohol.

Stage 2

In a reaction vessel (round-bottom flask with a stirrer, reflux condenser and dropping funnel), 8.4 g of LiCl are dissolved in 147.2 g of N-n-octyl-butyrolactam (Sigma-Aldrich) under a nitrogen atmosphere and while stirring. Thereafter, 13.6 g of meta-xylylenediamine are added and the clear mixture is heated to 80° C. Subsequently, 76.1 g of the monoadduct formed from Desmodur T100 and 1-dodecanol are added dropwise while stirring within 1 hour, at such a rate that the temperature does not rise above 85° C. To complete the reaction, the reaction mixture is stirred at 80° C. for 3 hours. A slightly cloudy product having good flowability is obtained. The proportion of the urea component in the product obtained is 37% by weight.

Product Example a15

Stage 1

First of all, a monoadduct is prepared according to patent specification EP 1188779 from tolylene 2,4-diisocyanate (Desmodur T100, Bayer) and lauryl alcohol.

Stage 2

In a reaction vessel (round-bottom flask with a stirrer, reflux condenser and dropping funnel), 1.7 g (0.039 mol) of LiCl are dissolved in 75 g of N-n-hexyl-butyrolactam (example 3a) under a nitrogen atmosphere and while stirring. Thereafter, 3.6 g (0.026 mol) of meta-xylylenediamine are added and the clear mixture is heated to 80° C. Subsequently, 19.8 g (0.052 mol) of the monoadduct formed from Desmodur T100 and 1-dodecanol are added dropwise while stirring within 1 hour, at such a rate that the temperature does not rise above 85° C. To complete the reaction, the reaction mixture is stirred at 80° C. for 3 hours. A clear and fluid product is obtained. The proportion of the urea component in the product obtained is 23% by weight.

Product Example a16

Stage 1

First of all, a monoadduct is prepared according to patent specification EP 1188779 from tolylene 2,4-diisocyanate (Desmodur T100, Bayer) and lauryl alcohol.

Stage 2

In a reaction vessel (round-bottom flask with a stirrer, reflux condenser and dropping funnel), 8.4 g of LiCl are dissolved in 147.2 g of N-n-hexyl-butyrolactam (example 3a) under a nitrogen atmosphere and while stirring. Thereafter, 13.6 g of meta-xylylenediamine are added and the clear mixture is heated to 80° C. Subsequently, 76.1 g of the monoadduct formed from Desmodur T100 and 1-dodecanol are added dropwise while stirring within 1 hour, at such a rate that the temperature does not rise above 85° C. To complete the reaction, the reaction mixture is stirred at 80° C. for 3 hours. A slightly cloudy product having good flowability is obtained. The proportion of the urea component in the product obtained is 37% by weight.

Product Examples—Overview

| Product example | (A)/% | (B) $R^1$ | $R^2$ | $R^3$ | % | (D)/% |
|---|---|---|---|---|---|---|
| a1 | H1/38 | together: $CH_2-CH_2-CH_2$ | | n-octyl | 60 | LiCl/2 |
| a2 | H1/38 | together: $CH_2-CH_2-CH_2$ | | benzyl | 60 | LiCl/2 |
| a3* | H1/52 | together: $CH_2-CH_2-CH_2$ | | n-propyl | 45 | LiCl/4 |
| a4* | H1/38 | together: $CH_2-CH_2-CH_2$ | | n-pentyl | 60 | LiCl/2 |
| a5 | H1/38 | together: $CH_2-CH_2-CH_2$ | | n-hexyl | 60 | LiCl/2 |
| a6 | H1/23 | n-octyl/n-decyl mixture | methyl | methyl | 75 | LiCl/2 |
| a7 | H1/23 | methyl | n-butyl | n-butyl | 75 | LiCl/2 |
| a8 | H2/29 | n-octyl/n-decyl mixture | methyl | methyl | 70 | LiCl/1 |
| a9 | H2/29 | methyl | n-butyl | n-butyl | 70 | LiCl/1 |
| a10 | H2/38 | together: $CH_2-CH_2-CH_2$ | | benzyl | 60 | LiCl/2 |
| a11 | H2/38 | together: $CH_2-CH_2-CH_2$ | | n-octyl | 60 | LiCl/2 |
| a12 | H3/23 | together: $CH_2-CH_2-CH_2$ | | n-octyl | 75 | LiCl/2 |
| a13 | H3/27 | together: $CH_2-CH_2-CH_2$ | | benzyl | 70 | LiCl/3 |
| a14 | H3/37 | together: $CH_2-CH_2-CH_2$ | | n-octyl | 60 | LiCl/3 |
| a15 | H3/23 | together: $CH_2-CH_2-CH_2$ | | n-hexyl | 75 | LiCl/2 |
| a16 | H3/37 | together: $CH_2-CH_2-CH_2$ | | n-hexyl | 60 | LiCl/3 |

H1: adduct formed from 2 BuO—PEG—OC(O)NH-tolyl-NCO and 1 m-xylylenediamine
H2: adduct formed from 2 MeO—PEG—OC(O)NH-tolyl-NCO and 1 m-xylylenediamine
H3: adduct formed from 2 lauryl-OC(O)NH-tolyl-NCO and 1 m-xylylenediamine
*= noninventive Comparative Examples Comparative Example C1

Stage 1

First of all, 64.4 g of a diisocyanate monoadduct are prepared according to patent specification EP 1188779 from a polyethylene glycol monobutyl ether having a hydroxyl number of 220 mg KOH/g (determined according to DIN/ISO 4629) and a mixture of 35% tolylene 2,4-diisocyanate and 65% tolylene 2,6-diisocyanate.

Stage 2

A four-neck flask is provided with a stirrer, dropping funnel, thermometer and reflux condenser. 72.7 g of 1-ethylpyrrolidin-2-one are initially charged and heated to 120° C. while stirring under a nitrogen atmosphere. 4.2 g of lithium chloride are added and dissolved at this temperature while stirring within 1 hour. Subsequently, temperature is lowered to 80° C. 10.2 g of m-xylylenediamine are added and the mixture is homogenized. The isocyanate adduct prepared previously (stage 1) is added dropwise to the amine solution while stirring within 1 hour at a rate sufficiently slow that the temperature does not exceed 85° C. To complete the reaction, the reaction mixture is stirred at 80° C. for another 3 hours. A clear, yellow product is obtained. The amine number is 1 mg KOH/g (determined according to DIN 16945). The product contains 49% by weight of urea component.

Comparative Example C2

Stage 1

First of all, 64.4 g of a diisocyanate monoadduct are prepared according to patent specification EP 1188779 from a polyethylene glycol monobutyl ether having a hydroxyl number of 220 mg KOH/g (determined according to DIN/ISO 4629) and a mixture of 35% tolylene 2,4-diisocyanate and 65% tolylene 2,6-diisocyanate.

Stage 2

A four-neck flask is provided with a stirrer, dropping funnel, thermometer and reflux condenser. 72.7 g of dimethyl sulfoxide are initially charged and heated to 120° C. while stirring under a nitrogen atmosphere. 4.2 g of lithium chloride are added and dissolved at this temperature while stirring within 1 hour. Subsequently, temperature is lowered to 80° C. 10.2 g of m-xylylenediamine are added and the mixture is homogenized. The isocyanate adduct prepared previously (stage 1) is added dropwise to the amine solution while stirring within 1 hour at a rate sufficiently slow that the temperature does not exceed 85° C. To complete the reaction, the reaction mixture is stirred at 80° C. for another 3 hours. A clear, yellow product is obtained. The amine number is 1 mg KOH/g (determined according to DIN 16945). The product contains 49% by weight of urea component.

Comparative Example C3

Stage 1

First of all, 64.4 g of a diisocyanate monoadduct are prepared according to patent specification EP 1188779 from a polyethylene glycol monobutyl ether having a hydroxyl number of 220 mg KOH/g (determined according to DIN/ISO 4629) and a mixture of 35% tolylene 2,4-diisocyanate and 65% tolylene 2,6-diisocyanate.

Stage 2

A four-neck flask is provided with a stirrer, dropping funnel, thermometer and reflux condenser. 72.7 g of N-methylpyrrolidone are initially charged and heated to 120° C. while stirring under a nitrogen atmosphere. 4.2 g of lithium chloride are added and dissolved at this temperature while stirring within 1 hour. Subsequently, temperature is lowered to 80° C. 10.2 g of m-xylylenediamine are added and the mixture is homogenized. The isocyanate adduct prepared previously (stage 1) is added dropwise to the amine solution while stirring within 1 hour at a rate sufficiently slow that the temperature does not exceed 85° C. To complete the reaction, the reaction mixture is stirred at 80° C. for another 3 hours. A clear, yellow product is obtained. The product contains 49% by weight of urea component.

Comparative Example C4

Stage 1

First of all, a monoadduct is prepared according to patent specification EP 1188779 from tolylene 2,4-diisocyanate (Desmodur T100, Bayer) and lauryl alcohol.

Stage 2

In a reaction vessel (round-bottom flask with a stirrer, reflux condenser and dropping funnel), 1.7 g (0.039 mol) of LiCl are dissolved in 75 g of N-methylpyrrolidone (commercial material) under a nitrogen atmosphere and while stirring. Thereafter, 3.6 g (0.026 mol) of meta-xylylenediamine are added and the clear mixture is heated to 80° C. Subsequently, 19.8 g (0.052 mol) of the monoadduct formed from Desmodur T100 and lauryl alcohol are added dropwise while stirring within 1 hour, at such a rate that the temperature does not rise above 85° C. To complete the reaction, the reaction mixture is stirred at 80° C. for 3 hours. A clear and fluid product is obtained. The proportion of the urea component in the product obtained is 23% by weight.

Comparative Example C5

Stage 1

First of all, a monoadduct is prepared according to patent specification EP 1188779 from tolylene 2,4-diisocyanate (Desmodur T100, Bayer) and lauryl alcohol.

Stage 2

In a reaction vessel (round-bottom flask with a stirrer, reflux condenser and dropping funnel), 1.7 g (0.039 mol) of LiCl are dissolved in 75 g of 1-N-ethylpyrrolidone (commercial material) under a nitrogen atmosphere and while stirring. Thereafter, 3.6 g (0.026 mol) of meta-xylylenediamine are added and the clear mixture is heated to 80° C. Subsequently, 19.8 g (0.052 mol) of the monoadduct formed from Desmodur T100 and lauryl alcohol are added dropwise while stirring within 1 hour, at such a rate that the temperature does not rise above 85° C. To complete the reaction, the reaction mixture is stirred at 80° C. for 3 hours. A clear product of low viscosity is obtained. The proportion of the urea component in the product obtained is 23% by weight.

Comparative Example C6

Stage 1

First of all, 93.6 g of a monoadduct are prepared according to patent specification EP 1188779 from a polyethylene glycol monomethyl ether having a molar mass of 450 g/mol and a mixture of 35% tolylene 2,4-diisocyanate and 65% tolylene 2,6-diisocyanate.

Stage 2

In a four-neck flask with a stirrer, dropping funnel, thermometer and reflux condenser, 99.7 g of N-methylpyrrolidone (BASF commercial material) are heated to 100° C. and, on attainment of the temperature, 4.2 g of lithium chloride are added. The lithium chloride is then dissolved at 100° C. while stirring within 1 hour. Subsequently, the temperature is lowered to 80° C. 10.2 g of m-xylylenediamine are added and the mixture is homogenized. The isocyanate adduct prepared previously (stage 1) is added dropwise to the amine solution while stirring within 1 hour at a rate sufficiently slow that the temperature does not exceed 85° C. To complete the reaction, the reaction mixture is stirred at 80° C. for 3 hours. A clear, yellowish product is obtained. The product contains 50% by weight of urea component.

Comparative Example C7

Stage 1

First of all, 93.6 g of a monoadduct are prepared according to patent specification EP 1188779 from a polyethylene glycol monomethyl ether having a molar mass of 450 g/mol and a mixture of 35% tolylene 2,4-diisocyanate and 65% tolylene 2,6-diisocyanate.

Stage 2

In a four-neck flask with a stirrer, dropping funnel, thermometer and reflux condenser, 132.0 g of dimethyl sulfoxide (commercial material from Sigma-Aldrich) are heated to 100° C. and, on attainment of the temperature, 4.2 g of lithium chloride are added. The lithium chloride is then dissolved at 100° C. while stirring within 1 hour. Subsequently, the temperature is lowered to 80° C. 10.2 g of m-xylylenediamine are added and the mixture is homogenized. The isocyanate adduct prepared previously (stage 1) is added dropwise to the amine solution while stirring within 1 hour at a rate sufficiently slow that the temperature does not exceed 85° C. To complete the reaction, the reaction mixture is stirred at 80° C. for 3 hours. A clear, yellowish product is obtained. The product contains 43% by weight of urea component.

Comparative Example C8

Stage 1

First of all, 93.6 g of a monoadduct are prepared according to patent specification EP 1188779 from a polyethylene glycol monomethyl ether having a molar mass of 450 g/mol and a mixture of 35% tolylene 2,4-diisocyanate and 65% tolylene 2,6-diisocyanate.

Stage 2

In a four-neck flask with a stirrer, dropping funnel, thermometer and reflux condenser, 99.7 g of N-ethylpyrrolidone (BASF commercial material) are heated to 100° C. and, on attainment of the temperature, 4.2 g of lithium chloride are added. The lithium chloride is then dissolved at 100° C. while stirring within 1 hour. Subsequently, the temperature is lowered to 80° C. 10.2 g of m-xylylenediamine are added and the mixture is homogenized. The isocyanate adduct prepared previously (stage 1) is added dropwise to the amine solution while stirring within 1 hour at a rate sufficiently slow that the temperature does not exceed 85° C. To complete the reaction, the reaction mixture is stirred at 80° C. for 3 hours. A clear, yellowish product is obtained. The product contains 50% by weight of urea component.

Comparative Example C9

Stage 1

First of all, a monoadduct is prepared according to patent specification EP 1188779 from tolylene 2,4-diisocyanate (Desmodur T100, Bayer) and lauryl alcohol.

Stage 2

In a reaction vessel (round-bottom flask with a stirrer, reflux condenser and dropping funnel), 1.7 g (0.039 mol) of LiCl are dissolved in 75 g of dimethyl sulfoxide under a nitrogen atmosphere and while stirring. Thereafter, 3.6 g (0.026 mol) of meta-xylylenediamine are added and the clear mixture is heated to 80° C. Subsequently, 19.8 g (0.052 mol) of the monoadduct formed from Desmodur T100 and lauryl alcohol are added dropwise while stirring within 1 hour, at such a rate that the temperature does not rise above 85° C. To complete the reaction, the reaction mixture is stirred at 80° C. for 3 hours. A clear and fluid product is obtained. The proportion of the urea component in the product obtained is 23% by weight. The product is stored in a closed vessel at room temperature. In contrast with all other comparative examples, a slight sediment is already detectable after one week; after two weeks, the product is highly turbid.

Comparative Example C10

Stage 1

First of all, a monoadduct is prepared according to patent specification EP 1188779 from tolylene 2,4-diisocyanate (Desmodur T100, Bayer) and lauryl alcohol.

Stage 2

In a reaction vessel (round-bottom flask with a stirrer, reflux condenser and dropping funnel), 8.4 g of LiCl are dissolved in 147.2 g of N-methylpyrrolidone under a nitrogen atmosphere and while stirring. Thereafter, 13.6 g of meta-xylylenediamine are added and the clear mixture is heated to 80° C. Subsequently, 76.1 g of the monoadduct formed from Desmodur T100 and 1-dodecanol are added dropwise while stirring within 1 hour, at such a rate that the temperature does not rise above 85° C. To complete the reaction, the reaction mixture is stirred at 80° C. for 3 hours. A slightly cloudy product having good flowability is obtained. The proportion of the urea component in the product obtained is 37% by weight.

Comparative Example C11

Stage 1

First of all, a monoadduct is prepared according to patent specification EP 1188779 from tolylene 2,4-diisocyanate (Desmodur T100, Bayer) and lauryl alcohol.

Stage 2

In a reaction vessel (round-bottom flask with a stirrer, reflux condenser and dropping funnel), 1.7 g (0.039 mol) of LiCl are dissolved in 75 g of N-n-pentylbutyrolactam (example 4a) under a nitrogen atmosphere and while stirring. Thereafter, 3.6 g (0.026 mol) of meta-xylylenediamine are added and the clear mixture is heated to 80° C. Subsequently, 19.8 g (0.052 mol) of the monoadduct formed from Desmodur T100 and 1-dodecanol are added dropwise while stirring within 1 hour, at such a rate that the temperature does not rise above 85° C. To complete the reaction, the reaction mixture is stirred at 80° C. for 3 hours. A clear and fluid product is obtained. The proportion of the urea component in the product obtained is 23% by weight.

Comparative Example C12

Stage 1

First of all, a monoadduct is prepared according to patent specification EP 1188779 from tolylene 2,4-diisocyanate (Desmodur T100, Bayer) and lauryl alcohol.

Stage 2

In a reaction vessel (round-bottom flask with a stirrer, reflux condenser and dropping funnel), 8.4 g of LiCl are dissolved in 147.2 g of N-n-pentyl-butyrolactam (example 4a) under a nitrogen atmosphere and while stirring. Thereafter, 13.6 g of meta-xylylenediamine are added and the clear mixture is heated to 80° C. Subsequently, 76.1 g of the monoadduct formed from Desmodur T100 and 1-dodecanol are added dropwise while stirring within 1 hour, at such a rate that the temperature does not rise above 85° C. To complete the reaction, the reaction mixture is stirred at 80° C. for 3 hours. A slightly cloudy product of good flowability is obtained. The proportion of the urea component in the product obtained is 37% by weight.

Comparative Examples—Overview

| Comparative example | (A)/% | Solvent/% | (D)/% |
| --- | --- | --- | --- |
| C1 | H1/49 | N-ethylpyrrolidone/48 | LiCl/3 |
| C2 | H1/49 | DMSO/48 | LiCl/3 |
| C3 | H1/49 | N-methylpyrrolidone/48 | LiCl/3 |
| C4 | H3/23 | N-methylpyrrolidone/75 | LiCl/2 |
| C5 | H3/23 | N-ethylpyrrolidone/75 | LiCl/2 |
| C6 | H2/50 | N-methylpyrrolidone/48 | LiCl/2 |
| C7 | H2/43 | DMSO/55 | LiCl/2 |
| C8 | H2/50 | N-ethylpyrrolidone/48 | LiCl/2 |
| C9 | H3/23 | DMSO/75 | LiCl/2 |
| C10 | H3/37 | N-methylpyrrolidone/60 | LiCl/3 |
| C11 | H3/23 | N-n-pentylbutyrolactam/75 | LiCl/2 |
| C12 | H3/37 | N-pentylbutyrolactam/60 | LiCl/3 |

H1: adduct formed from 2 BuO-PEG-OC(O)NH-tolyl-NCO and 1 m-xylylenediamine
H2: adduct formed from 2 MeO-PEG-OC(O)NH-tolyl-NCO and 1 m-xylylenediamine
H3: adduct formed from 2 lauryl-OC(O)NH-tolyl-NCO and 1 m-xylylenediamine Performance Testing of the Compositions that are Suitable as Rheology Control Agents Raw Materials Used

| Name | Description | Manufacturer |
| --- | --- | --- |
| Bayferrox 130M | Iron oxide red pigment | Bayer |
| Blanc Fixe M | Barium sulfate | Sachtleben Chemie GmbH |
| Borchi Nox M 2 | Synthetic anti-skinning agent (methyl ethyl ketoxime) | OMG Borchers GmbH |
| BYK-052 | Silicone-free polymer defoamer | BYK-Chemie GmbH |
| BYK-066 | Silicone-containing defoamer | BYK-Chemie GmbH |
| BYK-306 | Silicone-containing surface additive | BYK-Chemie GmbH |
| Desmodur N3390 | Aliphatic polyisocyanate (HDI trimerizate) | Bayer MaterialScience |
| Disperbyk-110 | Wetting and dispersing additive | BYK-Chemie GmbH |
| Dowanol PM | Methoxypropanol | Dow Chemical Company |
| Dowanol PMA | Propane-1,2-diol monoacetate monomethyl ether | Dow Chemical Company |
| Epikote 1001-X 75 | Bisphenol A resin, dissolved in xylene | Hexion Specialty Chemicals |
| Epikure 3115-X 70 | Polyamide hardener | Hexion Specialty Chemicals |
| Isopar H | Hydrocarbon solvent with low odor and low aromatics content (mainly consisting of isoalkanes) | ExxonMobil Chemical |
| Joncryl 8280 | Acrylate dispersion | BASF SE Coatings & Plastic Chemicals |
| Kraton 1118 AS | Styrene-butadiene block copolymer | Kraton Performance Polymers |
| Nuodex Combi APB | Lead-and barium-free combination drying agent | Elementis Specialties B.V. |
| Palapreg P 17-02 | Unsaturated polyester resin for production of fiber-reinforced plastics or of non-reinforced filled products | DSM Composite Resins |
| Setalux D A 870 BA | Polyisocyanate-crosslinking acrylate resin, 70% in butyl acetate | Nuplex Resins GmbH |
| Synthalat W48 | Water-thinnable, specifically modified alkyd resin, about 35% in BG/ammonia/water (8:2.3:54.7) | Synthopol Chemie |
| Tronox RKB-4 | Micronized rutile pigment | Kerr McGee Pigments |
| Worléekyd S 366 | Long-oil alkyd resin, 60% in Isopar H | Worlée Chemie GmbH |

Explanation of the Rating Scale

| Gel strength: | 1 | very strong |
| --- | --- | --- |
|  | 2 | strong |
|  | 3 | average |
|  | 4 | very weak |
|  | 5 | no gel |
| Turbidity (compatibility): | 1 | clear |
|  | 2 | slightly turbid |
|  | 3 | turbid |
|  | 4 | severely turbid |
|  | 5 | very severely turbid |

Test System 1: Setalux D A 870 BA Clear Varnish

For this test—if required—a content of the urea compound of 38% by weight in the additive composition is established by adding a further amount of the particular amide compound to the composition for all products tested. A 100 mL glass bottle is initially charged with 50 g of Setalux D A 870 BA clear varnish and then the particular additive is incorporated while stirring with the Dispermat CV (toothed disk d=2.5 cm at 1000 rpm). On completion of addition, stirring was continued for another 1 minute. In all cases, a dosage that corresponds to 0.4% by weight of the urea component A (based on the total mass of the formulation) was chosen. Subsequently, the samples are left to stand at RT for 1 day, followed by visual assessment first of the gel strength as a measure of rheological efficacy and the compatibility of the additive on the basis of the turbidity. This is followed by the testing of the stability under load as a measure of the rheological efficacy under application conditions. For this purpose, the sample is stirred homogeneously with a spatula and then applied to contrast cards with a 30-300 µm step applicator and an automatic coating bench from BYK Gardner at a speed of 5 cm/s. After the application, the contrast cards are directly hung up horizontally for drying. After drying, the layer thickness in µm (wet) at which the paint does not run off is determined, meaning that no runs or bulging are apparent. The higher the value of the stability under load with use of the same active substance, the better the rheological efficacy. "Wet" relates to the original wet film thickness after application with the applicator prior to drying.

Formulation of the Clear Varnish:

| Setalux D A 870 BA clear varnish | |
| --- | --- |
| Setalux D A 870 BA | 80.0 |
| Butyl acetate | 9.9 |
| Dowanol PMA | 9.9 |
| BYK-066 | 0.2 |
|  | 100.0 |

Results:

| Product | Component | Gel strength | Turbidity | Stability under load µm wet |
| --- | --- | --- | --- | --- |
| Blank sample without additive | — | 5 | 1 | 30 |
| Comparison C1 | NEP | 1-2 | 2 | 120 |
| Comparison C3 | NMP | 2 | 2 | 90 |
| Example a2 | Benzylpyrrolidone | 1 | 2 | 150 |

In the table, it is apparent that comparative examples C1 and C3 establish poorer gel strength than the inventive example a2. This is also manifested in the correspondingly poorer stability under load of the comparative examples compared to the inventive product.

Test System 2: Setalux D A 870 BA/Desmodur N3390 White Paint

For this test—if required—a content of the urea compound of 23% by weight in the additive composition is established by adding a further amount of the particular amide compound to the composition for all products tested. A 100 mL glass bottle is initially charged with 50 g of Setalux D A 870 BA white paint and then the particular additive is incorporated while stirring with the Dispermat CV (toothed disk d=2.5 cm at 1000 rpm). In all cases, a dosage that corresponds to 1.0% by weight of the urea component A (based on the total mass of the paint formulation) was chosen. On completion of addition, stirring was continued for another 1 minute. Subsequently, the samples are left to stand at RT for 1 day and, after incorporation of the hardener, the stability under load is assessed as a measure of rheological efficacy. For this purpose, the sample is first subjected to shear on an agitator (from Andalok, model: Nathalie) for 5 min. The shearing is directly followed by application to contrast cards effected with a 50-500 μm step applicator and an automatic coating bench from BYK Gardner at a speed of 5 cm/s. After the application, the contrast cards are directly hung up horizontally for drying. After drying, the layer thickness in μm (wet) at which the paint does not run off is determined, meaning that no runs or bulging are apparent. The higher the value of the stability under load with use of the same active substance, the better the rheological efficacy after shear stress.

Formulation of the Paint:

| | |
|---|---|
| Setalux D A 870 BA | 23.5 |
| Disperbyk-110 | 1.2 |
| Tronox RKB-4 | 34.0 |
| n-Butyl acetate | 8.5 |
| Dowanol PMA | 8.5 |

Dispermat CV, 1 mm glass beads 1:1, 30 min at 40° C., 8000 rpm, 4 cm Teflon disk

| | |
|---|---|
| Setalux D A 870 BA | 24.0 |
| BYK-306 | 0.3 |
| | 100.0 |
| Desmodur N3390 | 25.0 |

Results:

| Product | Solvent | Stability under load/μm wet (after shear) |
|---|---|---|
| Blank sample without additive | — | 30 |
| Comparative example C3 | NMP | 210 |
| Comparative example C2 | Dimethyl sulfoxide | 210 |
| Example a6 | Agnique AMD810 | 270 |

It is apparent in the table that comparative examples C2 and C3 enable poorer stability under load than the product of the invention.

Test System 3: Measurement of Viscosity on a White Paint

For this measurement—if required—a content of the urea compound of 23% by weight in the additive composition is established by adding a further amount of the particular amide compound to the composition for all products tested. A 100 mL glass bottle is initially charged with 50 g of Setalux D A 870 BA white paint (see test system 3) and then the particular additive is incorporated while stirring with the Dispermat CV (toothed disk d=2.5 cm at 1000 rpm). In all cases, a dosage that corresponds to 1.0% by weight of the urea component A (based on the total mass of the paint formulation) was chosen. On completion of addition, stirring was continued for another 1 minute. Subsequently, the samples are left to stand at room temperature for 1 day and then, in a CSR measurement (i.e. measurement with variation of the shear rate) on a rheometer, the viscosity of the polyol component is assessed in comparison with the blank sample (without rheology additive). The higher the viscosity in the low shear range, the better the rheological efficacy of the product. Rheometer used: Physica MCR-301 from Anton Paar, measurement parameters: CSR measurement, CP25-1, D=0.1-1000 1/s, 21 measurement points in logarithmic distribution, measurement duration 105 s, T=23° C.

BRIEF DESCRIPTION OF THE DRAWING

FIG. 1 is a viscosity curve which shows for inventive example a6 a much more marked viscosity-enhancing effect compared to the noninventive comparative examples.

Test System 4: Worléekyd S 366 Clear Varnish

For this test series—if required—a content of the urea compound of 23% by weight in the additive composition is established by adding a further amount of the particular amide compound to the composition for all products tested. A 100 mL glass bottle is initially charged with 50 g of Worléekyd S 366 clear varnish and then the particular additive is incorporated while stirring with the Dispermat CV (toothed disk d=2.5 cm at 1000 rpm). In all cases, a dosage that corresponds to 0.5% by weight of the urea component A (based on the total mass of the varnish formulation) was chosen. On completion of addition, stirring was continued for another 1 minute. Subsequently, the samples are left to stand at RT for 1 day and then the stability under load is assessed as a measure of rheological efficacy under application conditions. For this purpose, the sample is stirred uniformly with a spatula and then applied to contrast cards with a 30-300 μm step applicator and an automatic coating bench from BYK Gardner at a speed of 5 cm/s. After the application, the contrast cards are directly hung up horizontally for drying. After drying, the layer thickness in μm (wet) at which the paint does not run off is determined, meaning that no runs or bulging are apparent. The higher the value of the stability under load with use of the same active substance, the better the rheological efficacy.

Varnish Formulation:

| | |
|---|---|
| Worléekyd S 366, 60% in Isopar H | 80.9 |
| Isopar H | 16.0 |
| Nuodex Combi APB | 2.6 |
| Borchi Nox M 2 | 0.3 |
| BYK-066 | 0.2 |
| | 100.0 |

Results:

| Product | Solvent | Stability under load (μm wet) |
|---|---|---|
| Blank sample without additive | — | <30 |
| Comparative example C4 | NMP | 150 |
| Comparative example C5 | N-ethylpyrrolidone | 240 |
| Example a12 | N-octylpyrrolidone | 300 |
| Example a13 | benzylpyrrolidone | 300 |

It is apparent in the table that comparative examples C4 and C5 enable poorer stability under load (i.e. a lower maximum layer thickness) than the products of the invention.

Test System 5: Joncryl SCX8280/Butyl Glycol

For this test series—if required—a content of the urea compound of 38% by weight in the additive composition is established by adding a further amount of the particular amide compound to the composition for all products tested. A 100 mL glass bottle is initially charged with 50 g of Joncryl SCX8280 and 5% butyl glycol, and then the particular additive is incorporated while stirring with the Dispermat CV (toothed disk d=2.5 cm at 1000 rpm). In all cases, a dosage that corresponds to 0.5% by weight of the urea component A (based on the total mass of the varnish formulation) was chosen. On completion of addition, stirring was continued for another 1 minute. Subsequently, the samples are left to stand at RT for 1 day and then the stability under load is assessed as a measure of rheological efficacy under application conditions. For this purpose, the sample is stirred uniformly with a spatula and then applied to contrast cards with a 30-300 μm step applicator and an automatic coating bench from BYK Gardner at a speed of 5 cm/s. After the application, the contrast cards are directly hung up horizontally for drying. After drying, the layer thickness in μm wet at which the paint does not run off is determined, meaning that no runs or bulging are apparent. The higher the value of the stability under load with use of the same active substance, the better the rheological efficacy. In addition, after drying, a visual assessment for specks is also effected as a measure of the compatibility of the additive in the low layer thicknesses of 30-60 μm.

Varnish Formulation:

| | |
|---|---|
| Joncryl SCX 8280 | 95.0 |
| Butyl glycol | 5.0 |
| | 100.0 |

Results:

| Product | Solvent | Stability under load (μm wet) | Specks (visual) |
|---|---|---|---|
| Blank sample (no solvent) | | 90 | no |
| Comparative example C6 | NMP | 150 | no |
| Comparative example C7 | DMSO | 180 | yes |
| Example a11 | N-octylpyrrolidone | 210 | no |

It is apparent in the table that comparative examples C6 and C7 enable poorer stability under load (i.e. a lower maximum layer thickness) than the products of the invention. In comparative example C7, a tendency to form specks was additionally manifested.

Test System 6: Synthalat W48

For this test series—if required—a content of the urea compound of 38% by weight in the additive composition is established by adding a further amount of the particular amide compound to the composition for all products tested. A 100 mL glass bottle is initially charged with 50 g of Synthalat W48 (binder) and then the particular additive is incorporated while stirring with the Dispermat CV (toothed disk d=2.5 cm at 1000 rpm). In all cases, a dosage that corresponds to 1.0% by weight of the urea component A (based on the total mass of Synthalat W48) was chosen. On completion of addition, stirring was continued for another 1 minute. Subsequently, the samples are left to stand at RT for 1 day and then the stability under load is assessed as a measure of rheological efficacy under application conditions. For this purpose, the sample is stirred uniformly with a spatula and then applied to contrast cards with a 30-300 μm step applicator and an automatic coating bench from BYK Gardner at a speed of 5 cm/s. After the application, the contrast cards are directly hung up horizontally for drying. After drying, the layer thickness in μm wet at which the paint does not run off is determined, meaning that no runs or bulging are apparent. The higher the value of the stability under load with use of the same active substance, the better the rheological efficacy.

Results:

| Product | Solvent | Stability under load (μm wet) |
|---|---|---|
| Blank sample (without solvent) | | 60 |
| Comparative example C7 | Dimethyl sulfoxide | 150 |
| Comparative example C8 | NEP | 180 |
| Example a10 | Benzylpyrrolidone | 210 |

It is apparent in the table that comparative examples C7 and C8 enable poorer stability under load (i.e. a lower maximum layer thickness) than the product of the invention. In the case of comparative example C7, in addition, an unpleasant sulfide odor was manifested.

Test System 7: Anti-Separation Test in a Polyester System

In a 175 mL PE cup, the two binder components Palapreg P 17-02 and Kraton 1118 AS were first homogenized with the Dispermat CV at 1200 rpm with a 4 cm toothed disk for 1 min. 50 g of this mixture are then initially charged in a 175 mL PE cup and the particular additive is incorporated while stirring with the Dispermat CV (toothed disk d=2.5 cm at 1000 rpm). In all cases, a dosage that corresponds to 1.4% by weight of the urea component A (based on the total mass of Palapreg and Kraton) was chosen. On completion of addition, stirring is continued for another 2 minutes. Subsequently, the samples are introduced directly into 50 mL snap-lid bottles and left to stand at room temperature. After 3 days, the separation of the samples is assessed in % based on the total fill height in the snap-lid bottle, and the gel strength is visually assessed as a measure of rheological efficacy. The smaller the height of the separated phase, the better the rheological efficacy of the additive, and the better it can consequently be used to counter the separation of the two components.

Formulation of the Mixture:

| | |
|---|---|
| Palapreg P 17-02 | 70 |
| Kraton 1118 AS | 30 |
| | 100 |

Results:

| Sample | Solvent | Separation after 3 d at RT in % of fill height | Boiling point of the N-alkylamide component B (° C.) | Color of the mixture |
|---|---|---|---|---|
| Blank sample without solvent | — | 26 | — | Colorless |
| Comp. ex. C1* | NEP | 4 | 204 +/− 0 (a) | Yellowish color |

| Sample | Solvent | Separation after 3 d at RT in % of fill height | Boiling point of the N-alkylamide component B (° C.) | Color of the mixture |
|---|---|---|---|---|
| Comp. ex. C2 | DMSO | 0 | 189 (a) | Distinct grayish color |
| Example a4 | Pentyl-pyrrolidone** | 4 | 261 +/− 9 (a) | Slight yellowish color |
| Example a6 | Agnique AMD810 | 0 | 291 (b) | Slight yellowish color |
| Example a5 | Hexyl-pyrrolidone | 0 | 278 +/− 9 (a) | Slight yellowish color |
| Example a1 | N-Octyl-pyrrolidone | 0 | 303 (a) | Slight yellowish color |

*The composition of comp. ex. C1 was adjusted by addition of further N-ethylpyrrolidone such that the content of the urea compound in the additive formulation was 38% by weight.
**noninventive
(a) Source: SciFinder/(b) Source: commercial material is a mixture; reported value according to SciFinder for N,N-dimethyldecanamide The table shows that the inventive examples both have excellent anti-separation action and simultaneously do not exert any significant influence on the color of the mixture. In addition, the simultaneously high boiling points of the N-alkylamides present in the compositions of the invention are found to be a prerequisite for successful use in corresponding unsaturated polyester systems: since they are cured under hot conditions (called "closed mold" SMC application), volatile components are unusable, since they firstly lead to unwanted emissions in the course of curing, and the boiling process secondly gives rise to unwanted gas bubbles in the finished component. The inventive examples have boiling points of more than 270° C.; corresponding disadvantages are therefore not to be expected.

Test System 8: Storage Stability

To test storage stability, 50 mL samples of the corresponding products are stored in closed glass bottles at room temperature. At intervals of 2 months, the appearance of the samples is assessed visually.

| | | Appearance after . . . | | | |
|---|---|---|---|---|---|
| Product | Preparation | 2 months | 4 months | 6 months | 8 months |
| Comp. ex. C4 (23%) | Clear, liquid, homogeneous | Clear, liquid, homogeneous | Clear, liquid, homogeneous | Cloudy, inhomogeneous, sediment | Cloudy, inhomogeneous, sediment |
| Comp. ex. C5 (23%) | Clear, liquid, homogeneous | Clear, liquid, homogeneous | Clear, liquid, homogeneous | Clear, liquid, homogeneous | Cloudy, inhomogeneous, sediment |
| Comp. ex. C9: in DMSO about 23% | Clear, liquid, homogeneous | Cloudy, inhomogeneous, sediment (after 2 weeks: cloudy) | Cloudy, inhomogeneous, sediment | Cloudy, inhomogeneous, sediment | Cloudy, inhomogeneous, sediment |
| Comp. ex. C10: 37% in NMP | Clear, liquid, homogeneous | Clear, liquid, homogeneous | Cloudy, inhomogeneous, sediment | Cloudy, inhomogeneous, sediment | Cloudy, inhomogeneous, sediment |
| Comp. ex. C11 (23%) | Clear, liquid, homogeneous | Clear, liquid, homogeneous | Clear, liquid, homogeneous | Clear, liquid, homogeneous | Cloudy, inhomogeneous, sediment |
| Comp. ex. C12 (37%) | Clear, liquid, homogeneous | Clear, liquid, homogeneous | Clear, liquid, homogeneous | Cloudy, inhomogeneous, sediment | Cloudy, inhomogeneous, sediment |
| Example a15 (23%) | Clear, liquid, homogeneous | Clear, liquid, homogeneous | Clear, liquid, homogeneous | Clear, liquid, homogeneous | Clear, liquid, homogeneous |
| Example a16 (37%) | Clear, liquid, homogeneous | Clear, liquid, homogeneous | Clear, liquid, homogeneous | Clear, liquid, homogeneous | Clear, liquid, homogeneous |
| Example a12 (23%) | Clear, liquid, homogeneous | Clear, liquid, homogeneous | Clear, liquid, homogeneous | Clear, liquid, homogeneous | Clear, liquid, homogeneous |
| Example a14 (37%) | Clear, liquid, homogeneous | Clear, liquid, homogeneous | Clear, liquid, homogeneous | Clear, liquid, homogeneous | Clear, liquid, homogeneous |

The results show that the compositions of the invention firstly have better storage stability in general than the noninventive comparative examples. Furthermore, there is the advantage that corresponding storage-stable monophasicity also exists when a higher proportion of the urea component in the overall composition is implemented; corresponding composition ranges (higher proportion of the urea component A relative to the alkylamide compound B) are not obtainable at all in the noninventive comparative examples known from the prior art

The invention claimed is:

1. A urea preparation comprising
(A) 5% to 75% by weight of one or more urea components having a molecular weight of ≥350 g/mol and containing at least one urea group,
(B) 15% to 95% by weight of one or more organic solvents from the group of the N-alkylamides which have a molecular weight of 155 to 700 g/mol, are free of urea groups and have the following general formula (I):

in which
(a) $R^1$ is a hydrocarbyl radical containing x=1 to 24 carbon atoms,
$R^2$ is an organic radical containing y=1 to 12 carbon atoms, and
$R^3$ is an organic radical containing z=1 to 12 carbon atoms,
or
(b) $R^1$, $R^2$ and $R^3$ are as defined under (a), but $R^1$ and $R^2$ are bonded to one another by a chemical bond and together, with inclusion of the C(=O)N group, form a ring having 4 to 10 ring atoms; and, in the case of a ring having 4 or 5 ring atoms in which x+y<4, the $R^3$ radical contains at least 6 carbon atoms and at most 11 carbon atoms or
(c) $R^1$, $R^2$ and $R^3$ are as defined under (a), but $R^2$ and $R^3$ are bonded to one another by a chemical bond and together, with inclusion of the nitrogen atom in the general formula (I), form a ring having 4 to 10 ring atoms, with the proviso that, for each of (a), (b) and (c), $x+y+z\geq 8$, (C) 0% to 35% by weight of one or more organic solvents other than (B) which do not contain any urea group or any ionic group and have a maximum of two heteroatoms selected from the group consisting of nitrogen and oxygen, and (D) 0% to 50% by weight of a salt which differs from the urea component(s) (A), the solvent(s) (B) and the solvent(s) (C), and where all percent by weight figures are based on the total weight of the urea preparation.

2. The urea preparation as claimed in claim 1, comprising
(A) 10% to 65% by weight of the urea component(s) having a weight-average molecular weight of 350 to 60,000 g/mol and containing at least one urea group,
(B) 20% to 85% by weight of the organic solvent(s) from the group of the N-alkylamides having a molecular weight of 155 to 700 g/mol, being free of urea groups and having the general formula (I),
(C) 0% to 25% by weight of the organic solvent(s) other than (B) which do not contain any urea group or any ionic group and have a maximum of two heteroatoms selected from the group consisting of nitrogen and oxygen, and
(D) 0% to 15% by weight of the salt, and
where all percent by weight figures are based on the total weight of the urea preparation.

3. The urea preparation as claimed in claim 1, wherein 50% to 100% by weight of the solvent (B) of the general formula (I), based on the total weight of the solvent (B), is an intermolecular amide (B1) in which
$R^1$ is a branched or unbranched, saturated or unsaturated, hydrocarbyl radical containing 3 to 17 carbon atoms;
$R^2$ and $R^3$ in each case are the same or different and are independently a branched or unbranched, saturated or unsaturated organic radical having 1 to 6 carbon atoms,
or
$R^2$ and $R^3$ are joined to one another by a chemical bond and, with inclusion of the nitrogen atom in the general formula (I), form a ring having 5 to 7 ring atoms.

4. The urea preparation as claimed in claim 1 wherein 50% to 100% by weight of the solvent (B) of the general formula (I), based on the total weight of the solvent (B), is an intramolecular amide (B2) in which $R^1$ and $R^2$ are joined to one another by a chemical bond and, with inclusion of the C(=O)N group, form a ring having 4 to 8 ring atoms, where one or more ring carbon atoms are optionally substituted by a $C_1$-$C_4$-alkyl radical.

5. The urea preparations as claimed in claim 1, in which 70% to 100% by weight of the urea component (A), based on the total weight of the urea components (A), has either at least two urea groups or at least one urea group and at least one urethane group, or at least two urea groups and two urethane groups.

6. The urea preparations as claimed in claim 1, wherein
(i) 50% to 100% by weight of the urea component (A), based on the total weight of the urea components (A), of the general formula (II)

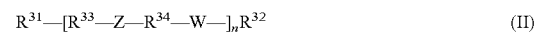

is present, in which
$R^{31}$ and $R^{32}$ in each case are the same or different and are each independently a branched or unbranched, saturated or unsaturated organic radical which contains 1 to 100 carbon atoms and has a maximum of one urea group in each case and a maximum of one urethane group in each case,
$R^{33}$ and $R^{34}$ in each case are the same or different and are each independently branched or unbranched polyester radicals containing 1 to 300 carbon atoms and optionally containing ether groups, branched or unbranched polyether radicals containing 2 to 300 carbon atoms, branched or unbranched polyamide radicals containing 1 to 300 carbon atoms, polysiloxane radicals containing 3 to 100 silicon atoms, branched or unbranched $C_2$-$C_{22}$-alkylene radicals, branched or unbranched $C_3$-$C_{18}$-alkenylene radicals, $C_5$-$C_{12}$-arylene radicals and/or branched or unbranched $C_7$-$C_{22}$-arylalkylene radicals,
Z and W in each case are the same or different and are each independently NH—CO—O and/or NH—CO—NH, and
n is an integer from 1 to 150;
or
(ii) 50% to 100% by weight of the urea component (A), based on the total weight of the urea components (A), in each case has a weight-average molecular weight of 2000 to 55,000 g/mol and contains 4 to 150 urea groups;
or
(iii) 50% to 100% by weight of the urea component (A), based on the total weight of the urea components (A), in each case of one or more of the general formulae selected from the group consisting of (IIIa), (IIIb), (IIIc) and (IIId)

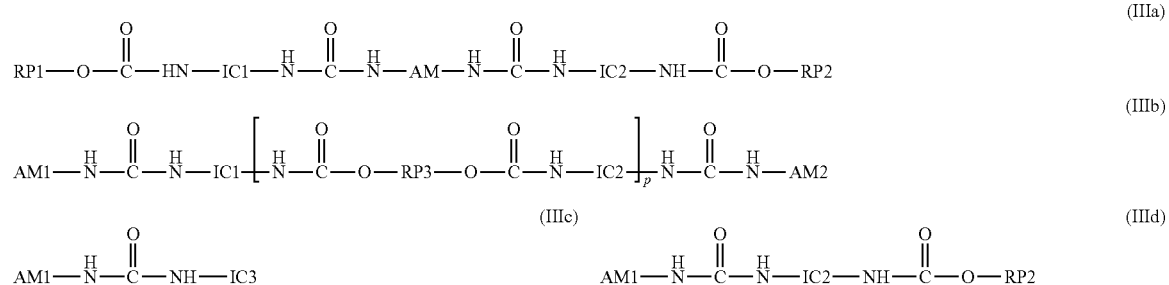

is present, in which

AM is a linear or branched, saturated or unsaturated, aliphatic, aromatic or aliphatic-aromatic organic radical having 2 to 50 carbon atoms, AM1 and AM2 in each case are the same or different and are each independently a linear or branched, saturated or unsaturated, aliphatic, aromatic or aliphatic-aromatic organic radical having 1 to 50 carbon atoms, where this organic radical may also have further functional groups such as hydroxyl groups or amino groups, IC1 and IC2 in each case are the same or different and are each independently a linear or branched, saturated or unsaturated, aliphatic, aromatic or aliphatic-aromatic hydrocarbyl radical having 2 to 40 carbon atoms, IC3 is a linear or branched, saturated or unsaturated, aliphatic, aromatic or aliphatic-aromatic hydrocarbyl radical having 2 to 24 carbon atoms, RP1 and RP2 in each case are the same or different and are each independently a linear or branched, saturated or unsaturated, aliphatic, aromatic or aliphatic-aromatic organic radical having 1 to 24 carbon atoms and/or a polyether radical having 1 to 120 ether oxygen atoms and/or a polyester radical having 1 to 100 ester groups and optionally containing ether groups and/or a polyamide radical having 1 to 100 amide groups and/or a polysiloxane radical having 3 to 100 silicon atoms, RP3 are the same or different and are a linear or branched, saturated or unsaturated, aliphatic, aromatic or aliphatic-aromatic hydrocarbyl radical having 2 to 24 carbon atoms and/or a (poly)ether radical having 1 to 120 ether oxygen atoms and/or a polyamide radical having 1 to 100 amide groups and/or a polysiloxane radical having 3 to 100 silicon atoms and/or a polyester radical having 1 to 100 ester groups and optionally containing ether groups and p is 0 or 1.

7. The urea preparations as claimed in claim 1, wherein 70% to 100% by weight of the urea component (A), based on the total weight of the urea components (A), is obtained in each case by reaction of isocyanates oligomerized by isocyanurate and/or uretdione formation with monofunctional amines.

8. The urea preparations as claimed in claim 1, wherein 95% to 100% by weight, based on the total weight of the urea components (A), in each case has at least one molecular segment of the general formula (IVa)

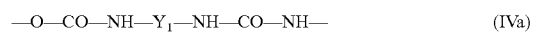

(IVa)

in which $Y_1$ is a saturated or unsaturated, branched or unbranched hydrocarbyl radical containing 4 to 20 carbon atoms, and in each case no molecular segment of the general formula (IVb)

(IVb)

in which $Y_2$ is a saturated or unsaturated, branched or unbranched hydrocarbyl radical containing 4 to 20 carbon atoms.

9. The urea preparations as claimed in claim 1, wherein the solvent (C) is selected from the group consisting of aliphatic hydrocarbons, cycloaliphatic hydrocarbons, terpenes, terpenoids, aromatic hydrocarbons, hydrochlorocarbons, alcohols, ketones, esters, glycol ethers, ethers, amides, sulfoxides, sulfones, acetals and nitroalkanes.

10. The urea preparations as claimed in claim 1, wherein the salt (D) is selected from the group consisting of (i) ionic liquids and/or (ii) alkali metal salts, alkaline earth metal salt and/or ammonium salts, with monovalent anions from the group consisting of halides, pseudohalides, formates, acetates and/or nitrates.

11. The urea preparations as claimed in claim 1, wherein these consist of (A) and (B); or of (A), (B) and (C); or of (A), (B) and (D).

12. A liquid medium comprising a urea preparation as claimed in claim 1.

13. The liquid medium as claimed in claim 12, wherein the liquid medium is selected from the group consisting of varnishes, printing inks, other inks, pigment pastes, polymer formulations, cosmetic preparations, construction material formulations, ceramic formulations, lubricants, potting compounds, sealants, spraying agents, adhesives, and formulations useful in natural gas and mineral oil production.

* * * * *